US010009257B2

(12) United States Patent
Shiotani

(10) Patent No.: US 10,009,257 B2
(45) Date of Patent: Jun. 26, 2018

(54) COMMUNICATION SYSTEM, COMMUNICATION APPARATUS, AND COMMUNICATION METHOD, CONFIGURED TO TRANSFER CONTENT DATA TO TWO COMMUNICATION APPARATUSES BY WIRELESS COMMUNICATION

(71) Applicant: Yoshimitsu Shiotani, Kanagawa (JP)

(72) Inventor: Yoshimitsu Shiotani, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 163 days.

(21) Appl. No.: 15/013,355

(22) Filed: Feb. 2, 2016

(65) Prior Publication Data
US 2016/0248662 A1 Aug. 25, 2016

(30) Foreign Application Priority Data

Feb. 20, 2015 (JP) ................. 2015-031878

(51) Int. Cl.
H04L 12/707 (2013.01)
H04W 84/18 (2009.01)
H04W 40/20 (2009.01)

(52) U.S. Cl.
CPC ........... *H04L 45/22* (2013.01); *H04W 40/205* (2013.01); *H04W 84/18* (2013.01)

(58) Field of Classification Search
None
See application file for complete search history.

(56) References Cited

U.S. PATENT DOCUMENTS 8,570,859 B1* 10/2013 Satapathy ................. H04L 1/22
370/225
9,730,082 B2* 8/2017 Park ..................... H04W 16/26
(Continued)

FOREIGN PATENT DOCUMENTS

JP 2008-186565 7/2006
JP 2008-005306 1/2008
(Continued)

OTHER PUBLICATIONS

Mar. 10, 2017 official action in connection with corresponding European Patent Application No. EP 16156033.9.
(Continued)

*Primary Examiner* — Donald Mills
(74) *Attorney, Agent, or Firm* — Cooper & Dunham LLP

(57) ABSTRACT

A communication system includes a first communication apparatus, a second communication apparatus, and a third communication apparatus. The first communication apparatus transfers content data to the second communication apparatus and the third communication apparatus using wireless communication. The second communication apparatus includes a first communication unit that transfers first control data including a reception request for receiving the content data transferred by the first communication apparatus if the wireless communication between the second communication apparatus and the first communication apparatus is disconnected. The third communication apparatus includes a second communication unit that transfers the content data transferred by the first communication apparatus to the second communication apparatus using the wireless communication if the third communication apparatus receives the first control data from the second communication apparatus.

20 Claims, 23 Drawing Sheets

(56) References Cited

U.S. PATENT DOCUMENTS

| | | | |
|---|---|---|---|
| 2004/0076164 A1* | 4/2004 | Vanderveen | H04L 45/28 370/400 |
| 2009/0232010 A1 | 9/2009 | Li et al. | |
| 2009/0232049 A1* | 9/2009 | Singh | H04W 84/18 370/328 |
| 2011/0134827 A1* | 6/2011 | Hooli | H04W 72/04 370/315 |
| 2011/0261684 A1 | 10/2011 | Li et al. | |
| 2012/0314639 A1 | 12/2012 | Shiotani | |
| 2013/0042280 A1 | 2/2013 | Chen | |
| 2014/0269260 A1* | 9/2014 | Xue | H04L 41/12 370/225 |
| 2014/0334374 A1* | 11/2014 | Hyde | H04W 16/26 370/315 |
| 2014/0337840 A1* | 11/2014 | Hyde | H04W 52/0229 718/1 |
| 2015/0189382 A1 | 7/2015 | Chen | |
| 2016/0127170 A1* | 5/2016 | Kim | H04L 5/0035 370/225 |
| 2017/0064583 A1* | 3/2017 | Roy | H04W 36/0005 |
| 2017/0201918 A1* | 7/2017 | Kim | H04W 36/08 |

FOREIGN PATENT DOCUMENTS

| | | |
|---|---|---|
| JP | 2011-047952 | 3/2011 |
| JP | 2013-229847 | 11/2013 |
| JP | 2014-016906 | 1/2014 |
| KR | 10-2010-0108464 | 10/2010 |

OTHER PUBLICATIONS

Andrew Tanenbaum et al.: "Computer Networks [SIB]" In: "Computer Networks [SIB]", Dec. 31, 2011, XP055350818, ISBN: 978-0-13-212695-3, pp. 731-733.

May 10, 2016 European Search Report in corresponding European Patent Application No. EP 16156033.9.

Singh et al: 'Blockage and Directivity in 60 GHz Wireless Personal Area Networks: From Cross-Layer Model to Multihop MAC Design,' IEEE Journal on Selected Areas in Communications, vol. 27, No. 8, Oct. 2009.

* cited by examiner

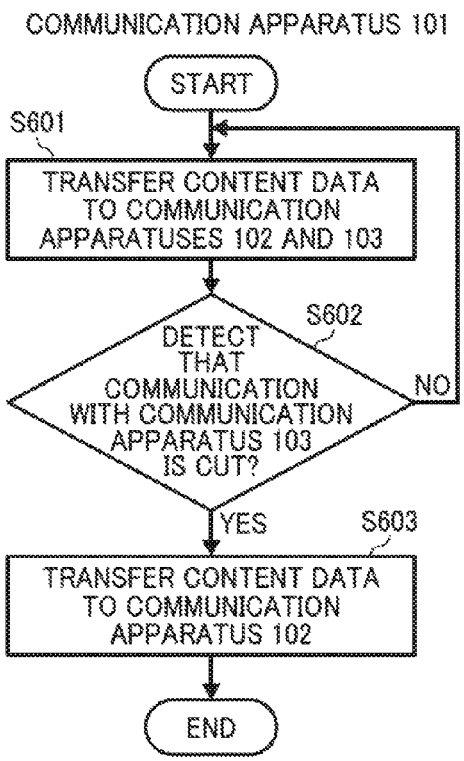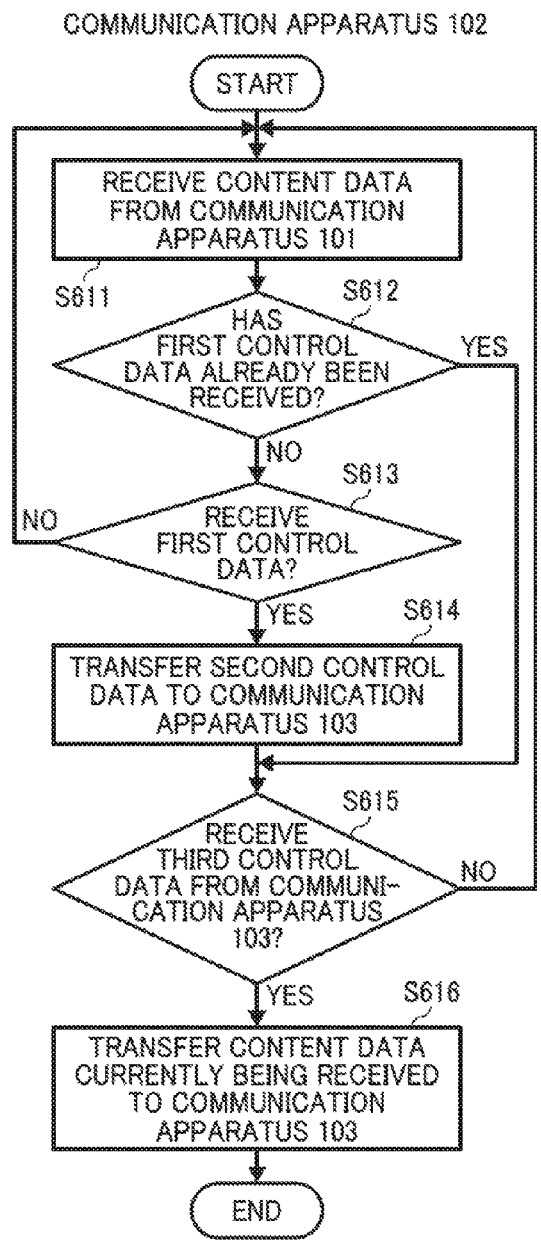

FIG. 8
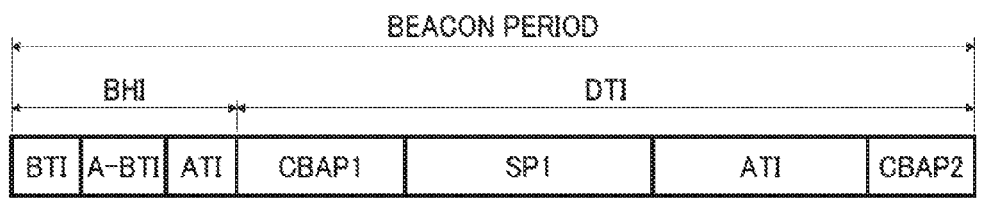
FIG. 9
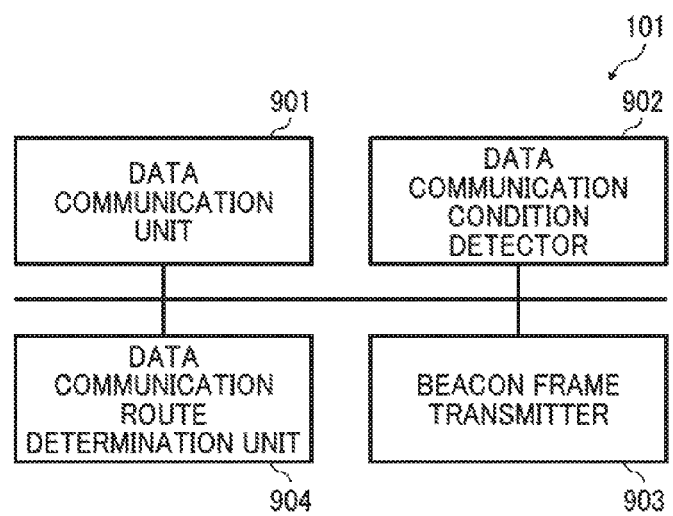
FIG. 10
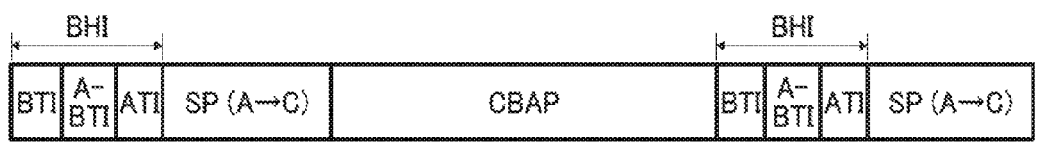

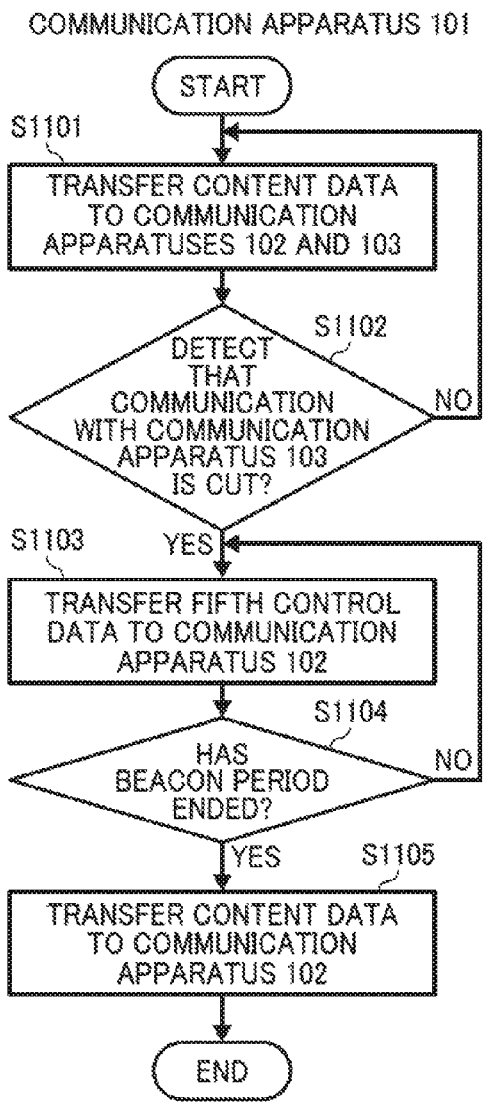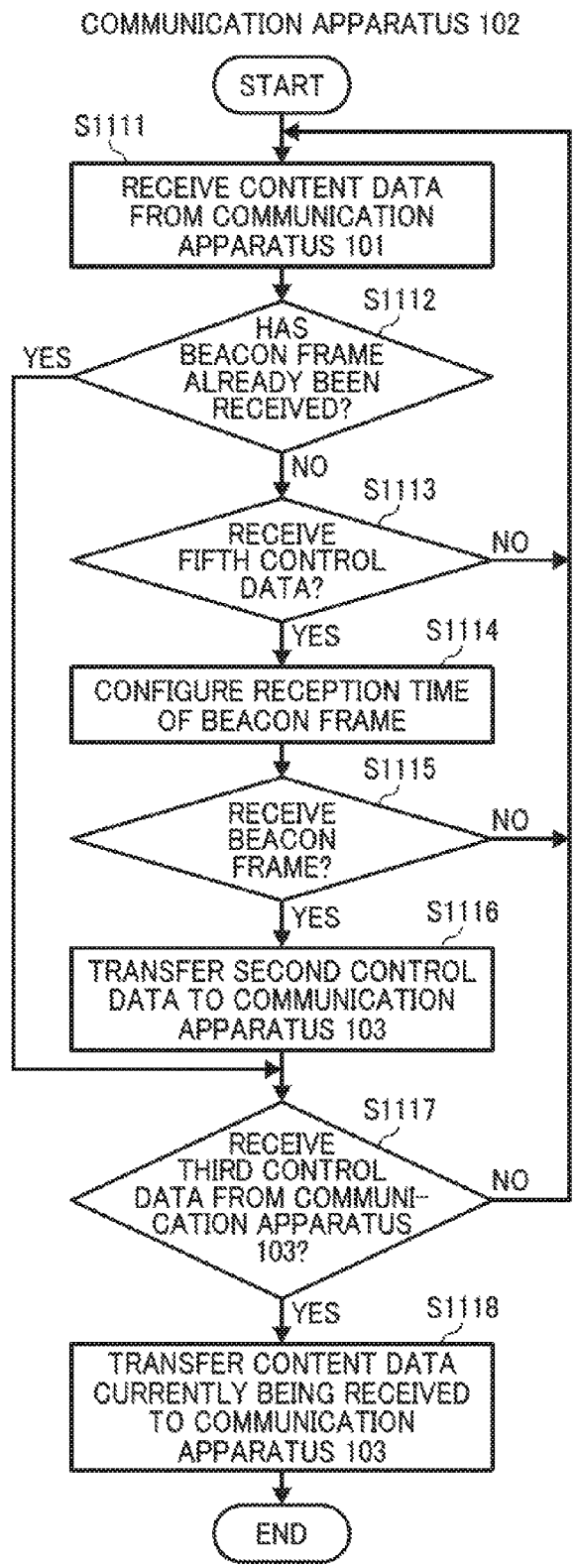

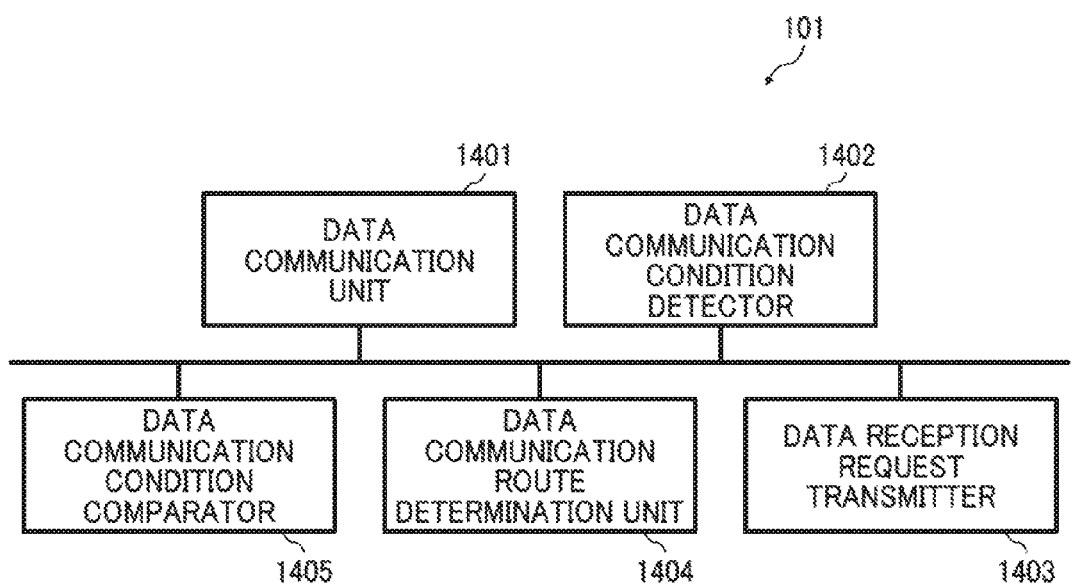

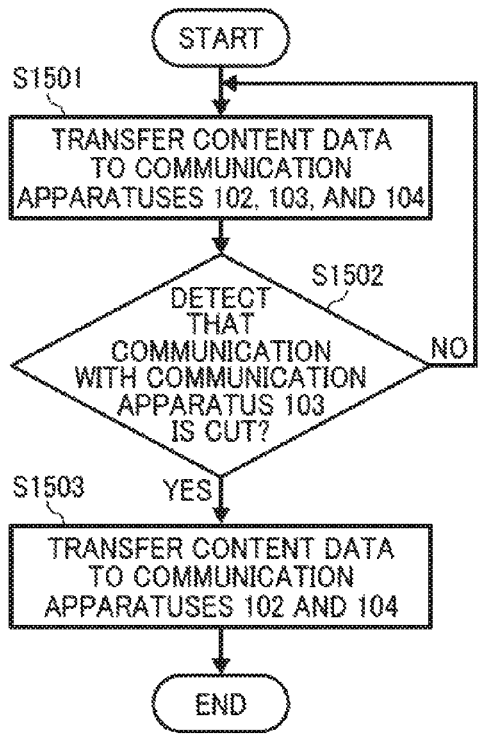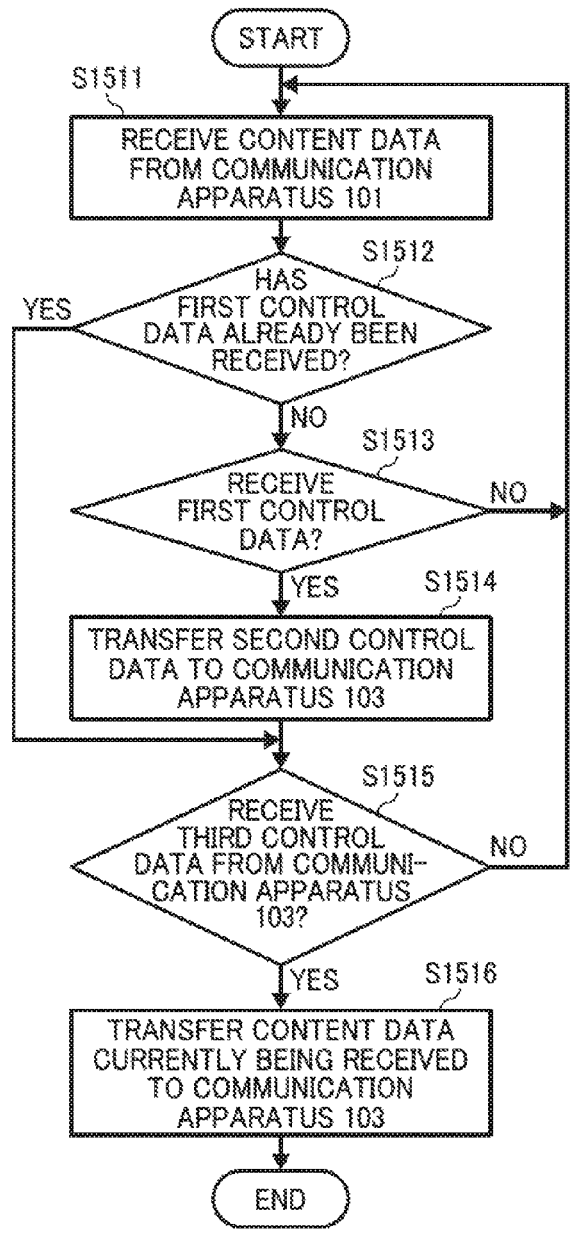

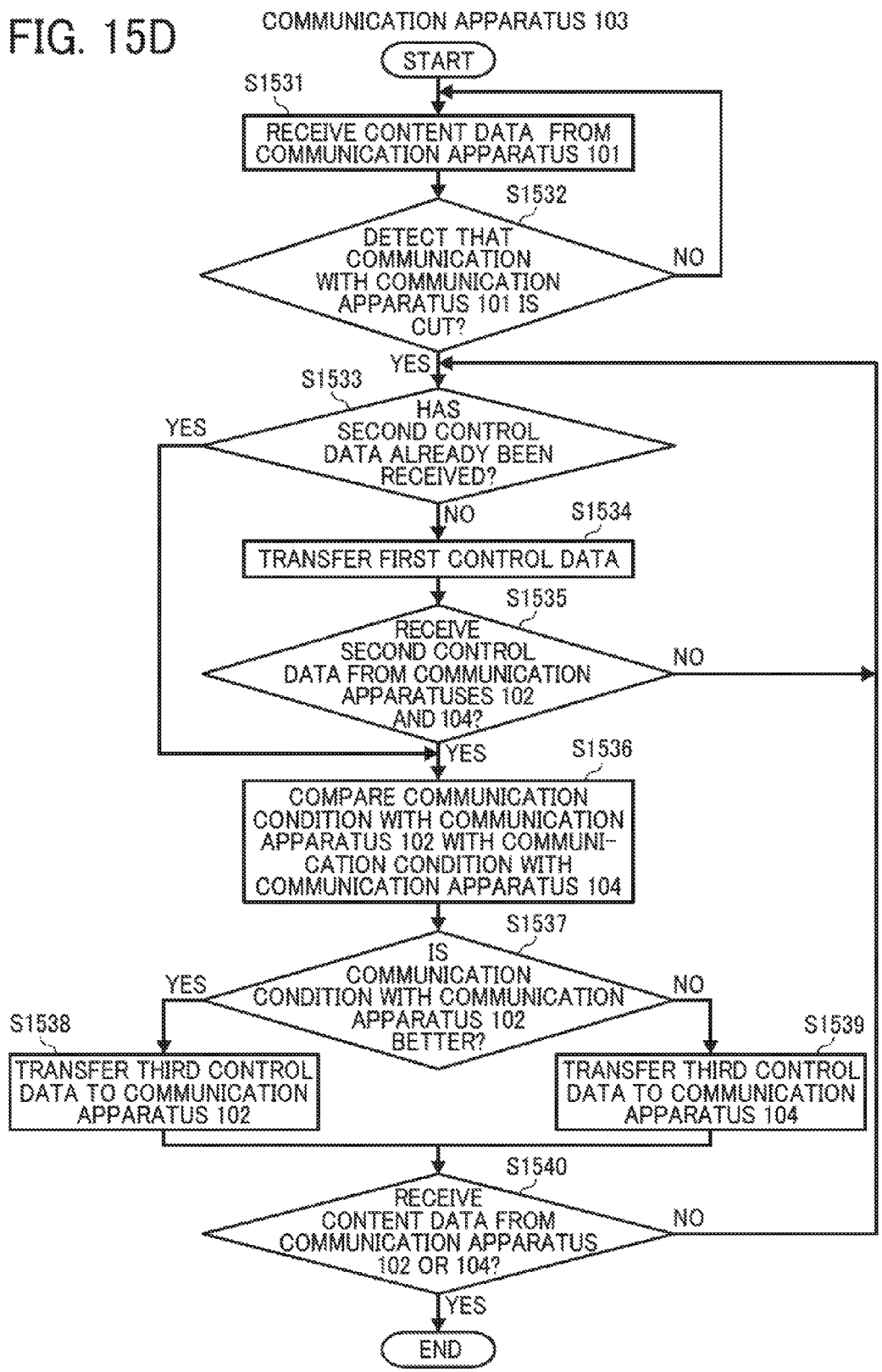

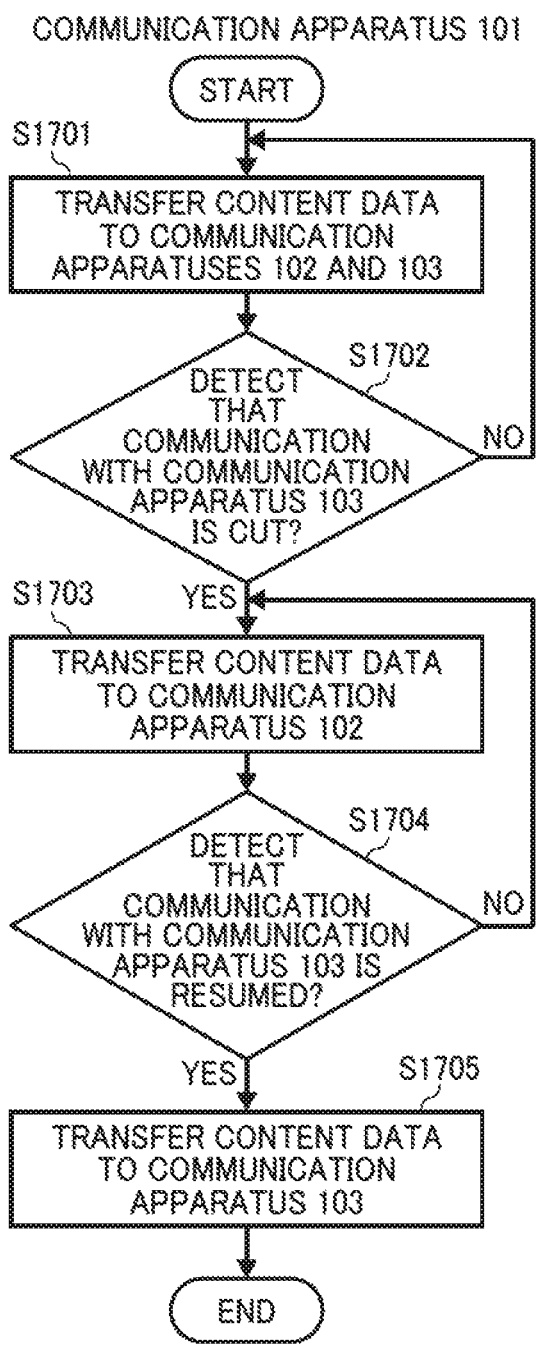

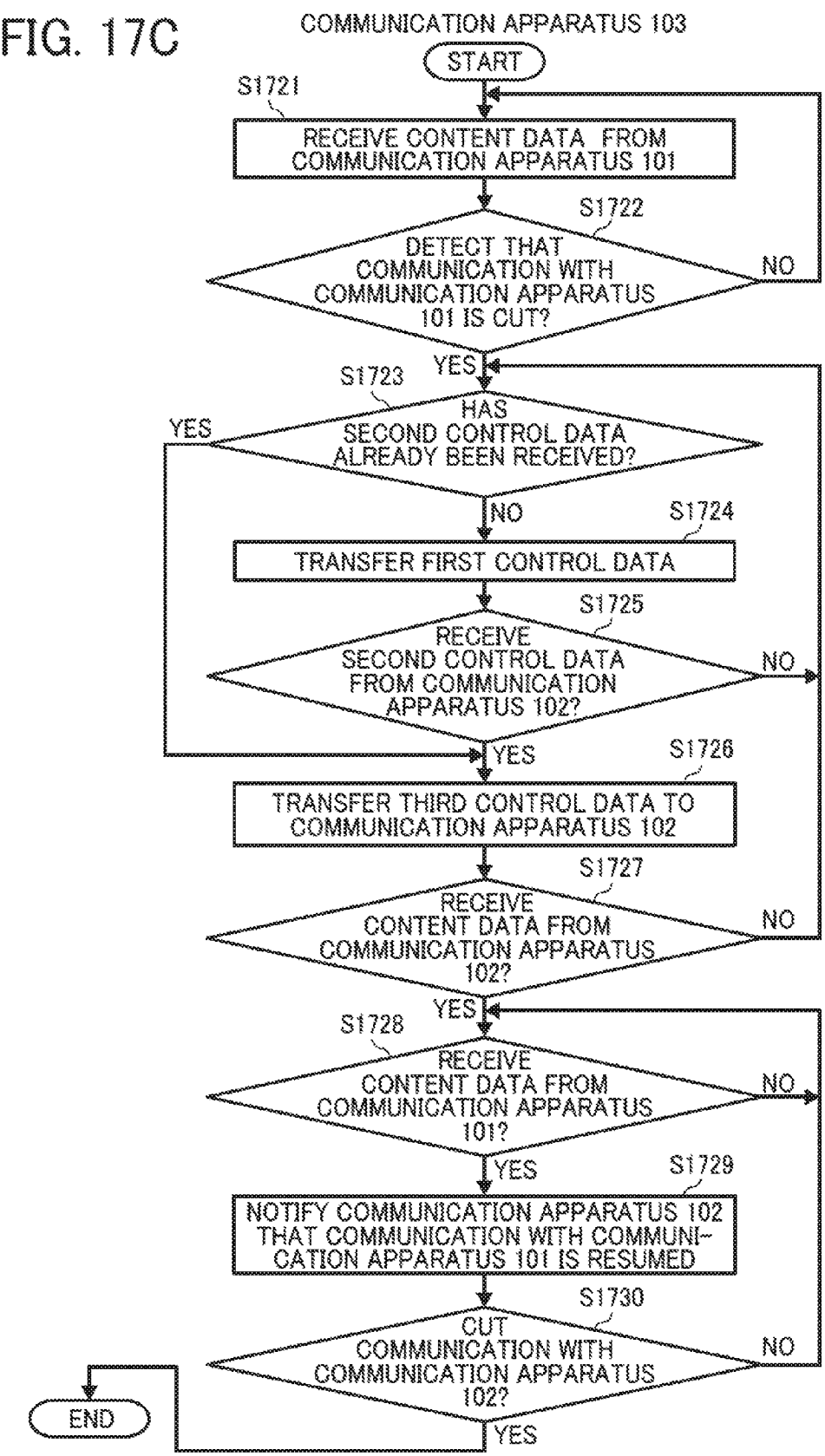

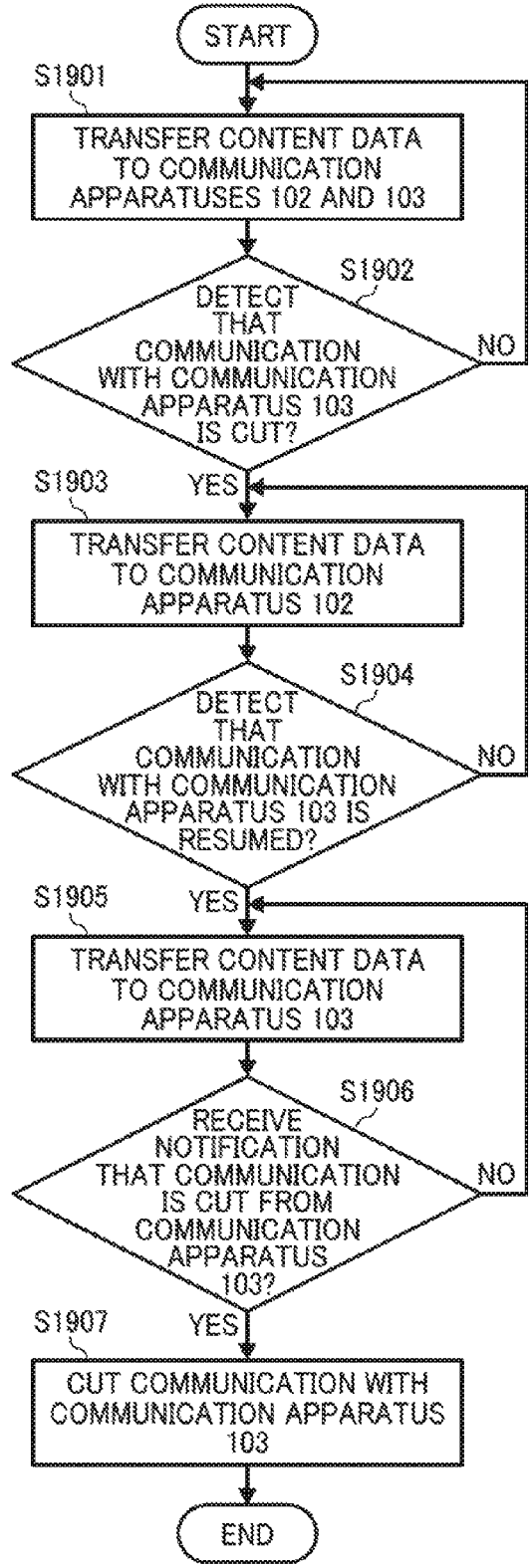

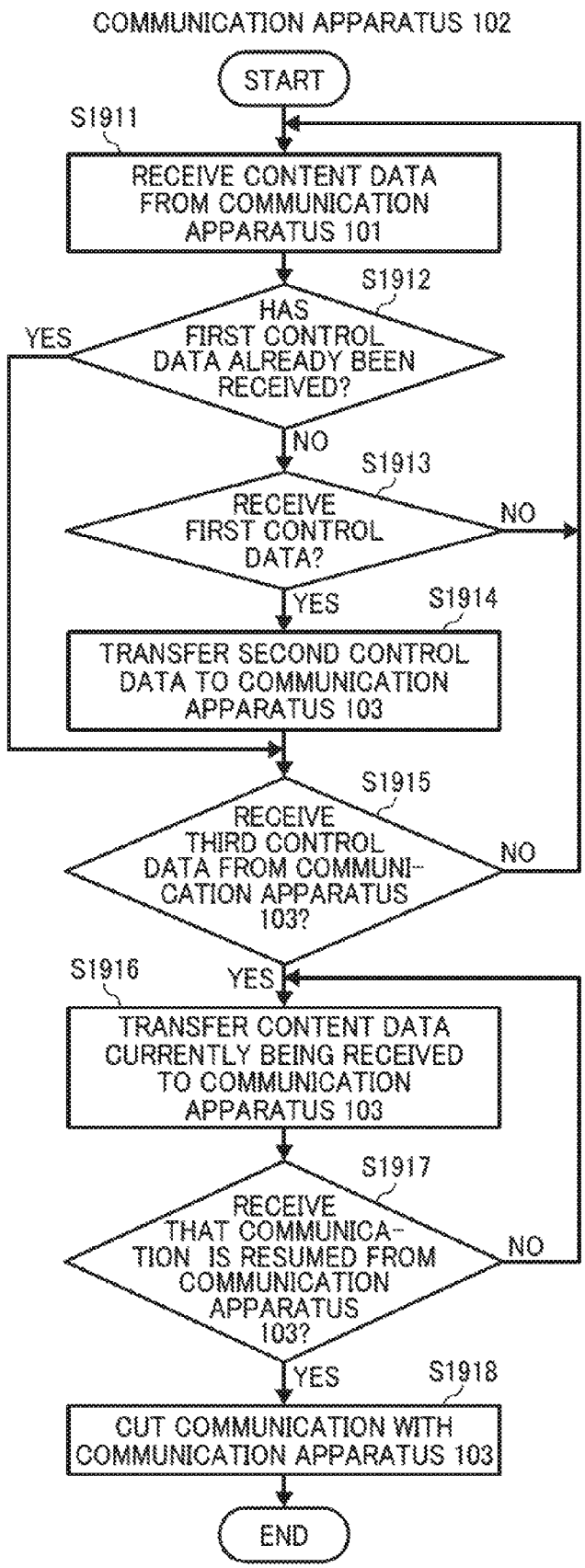

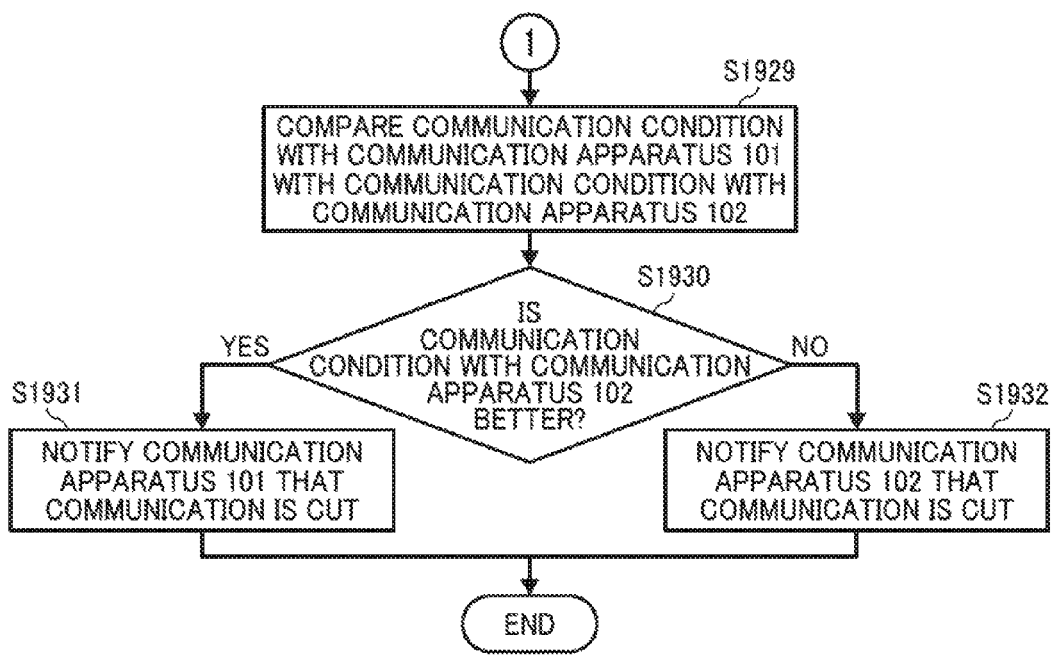

COMMUNICATION SYSTEM, COMMUNICATION APPARATUS, AND COMMUNICATION METHOD, CONFIGURED TO TRANSFER CONTENT DATA TO TWO COMMUNICATION APPARATUSES BY WIRELESS COMMUNICATION

CROSS-REFERENCE TO RELATED APPLICATIONS

This patent application is based on and claims priority pursuant to 35 U.S.C. § 119(a) to Japanese Patent Application No. 2015-031878, filed on Feb. 20, 2015 in the Japan Patent Office, the entire disclosures of which are hereby incorporated by reference herein.

BACKGROUND

Technical Field

The present invention relates to a communication system, a communication apparatus, and a communication method.

Background Art

Recently, EHF wireless communication is attracting attention as high-speed wireless communication. Recently, after integrating activities of Wireless Gigabit Alliance (WGA) with Wi-Fi Alliance, popularization of EHF wireless communication is expected, and its possibility is increasing. In the EHF wireless communication that uses 60 GHz frequency band, while it is possible to communicate at high speed and large capacity, its directivity is high, and its communication range is short due to its characteristics Hopping between wireless communication devices is considered as a method of extending communication distance. An Ad hoc multi-hop technology of wireless communication has been researched by Mobile Ad hoc Network (MANET). In the Ad hoc multi-hop technology, routing in the multi-hop network is controlled by using ad hoc wireless communication terminals such as wireless LAN, and content is transferred to a final destination device by hopping content data by relaying wireless communication devices. In IEEE 802.11s, a mesh network using wireless LAN is also standardized.

It is known to construct an autonomous distributed mesh network described above as a solution for the problem of the communication range in the EHF wireless communication. However, in the EHF wireless communication, since Time Division Multiple Access (TDMA) method is adopted, it is possible that calculation of a cost table such as time allocation for a routing control gets complicated, and it is possible that an appropriate hop destination device is not selected since a communication counterpart is limited due to the directivity of an antenna.

That is, in the known autonomous distributed mesh networks using the EHF wireless communication, it is possible that the routing control calculation of the wireless communication devices in the network and its process get complicated, and it could be difficult to control routing most appropriately due to the directivity of the antenna. In addition, it is unsatisfactory that the network configuration and communication routing cannot be modified flexibly.

A technology that checks sector congestions of an antenna in the multi-hop network and determines a sector in the transmitting direction based on the communication sector congestions is known.

A technology that changes communication counterparts for each time slot in wireless communication using TDMA protocol and changes directivity of the antenna on the basis of the time slot is also known.

SUMMARY

An example embodiment of the present invention provides a novel communication system that includes a first communication apparatus, a second communication apparatus, and a third communication apparatus. The first communication apparatus transfers content data to the second communication apparatus and the third communication apparatus using wireless communication. The second communication apparatus includes a first communication unit that transfers first control data including a reception request for receiving the content data transferred by the first communication apparatus if the wireless communication between the second communication apparatus and the first communication apparatus is disconnected. The third communication apparatus includes a second communication unit that transfers the content data transferred by the first communication apparatus to the second communication apparatus using the wireless communication if the third communication apparatus receives the first control data from the second communication apparatus.

Further embodiments of the present invention provide a communication apparatus, and a communication method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A, 6B, and 6C are diagrams illustrating a sequence that changes the communication route in the communication system as a first embodiment of the present invention.

FIG. 8 is a diagram illustrating allocation of time slots in a TDMA communication protocol.

FIG. 9 is a diagram illustrating a function implemented by the CPU 201 in the communication apparatus 101 as a third embodiment of the present invention.

FIG. 10 is a diagram illustrating allocation of time slots as the third embodiment of the present invention.

FIGS. 11A, 11B, and 11C are diagrams illustrating a sequence that changes the communication route in the communication system as the third embodiment of the present invention.

FIG. 14 is a diagram illustrating a function implemented by the CPU 201 in the communication apparatus 101 as the fourth embodiment of the present invention.

FIGS. 15A, 15B, 15C, and 15D are diagrams illustrating a sequence that changes the communication route in the communication system as the fourth embodiment of the present invention.

FIGS. 17A, 17B, and 17C are diagrams illustrating a sequence that changes the communication route in the communication system as the fifth embodiment of the present invention.

FIGS. 19A, 19B, 19CA, and 19CB are diagrams illustrating a sequence that changes the communication route in the communication system as the sixth embodiment of the present invention.

Figure 1:
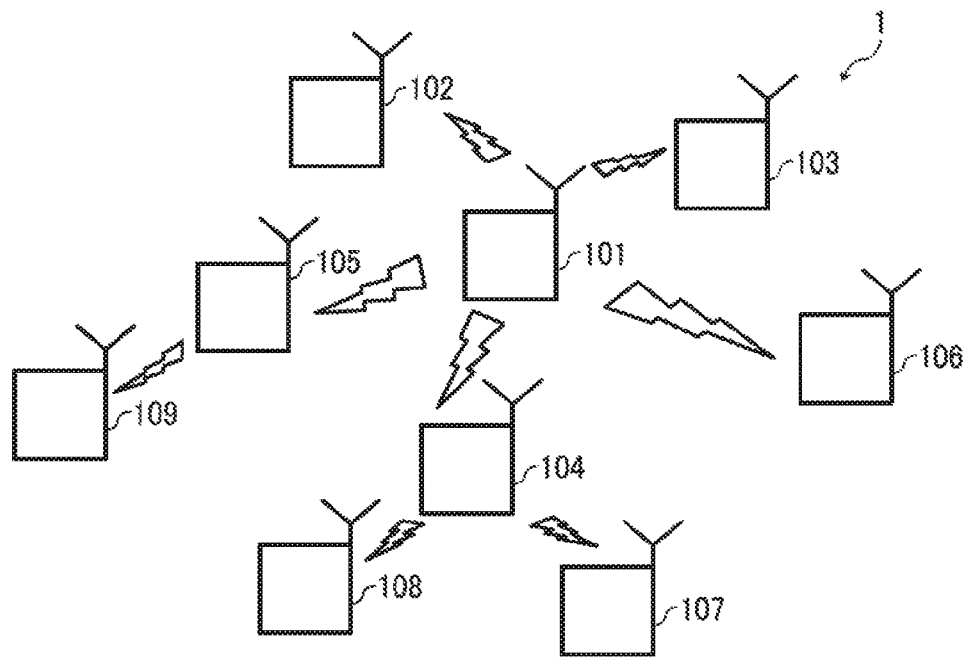
FIG. 1 is a diagram illustrating a communication system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the known technologies, if there is an obstacle between communication apparatuses, it is difficult to communicate between the communication apparatuses.

In addition, in the known technology, while it is possible to improve reliability in the multi-hop network, it is still possible that the control becomes meaningless if the communication counterpart device does not move. In addition, since the wireless transmitting direction is determined on the basis of the congestions of antenna sectors, it is possible that the number of hopping to the final destination becomes large and communication cost is increased.

In the embodiments described below, a communication system that can perform communication stably by establishing alternative communication route dynamically even if it is impossible to communicate between communication apparatuses is provided.

Embodiment 1

FIG. 1 is a diagram illustrating a communication system in this embodiment.

A communication system 1 in FIG. 1 includes multiple communication apparatuses 10N (i.e., N is an integer larger than 0). Both a notebook PC including a wireless interface (I/F) and a mobile device including the wireless I/F can be the communication apparatus 10N. In FIG. 1, 9 communication apparatuses are illustrated. However, it is possible that communication apparatuses less than 9 are included. Otherwise, it is possible that communication apparatuses equal to or more than 10 are included.

A mesh network consists of the multiple communication apparatuses 10N. In the mesh network, communication apparatuses perform wireless communication with each other to construct the communication system (the communication network). For example, as shown in FIG. 1, the communication apparatuses connected by a solid line can perform wireless communication with each other.

Figure 2:
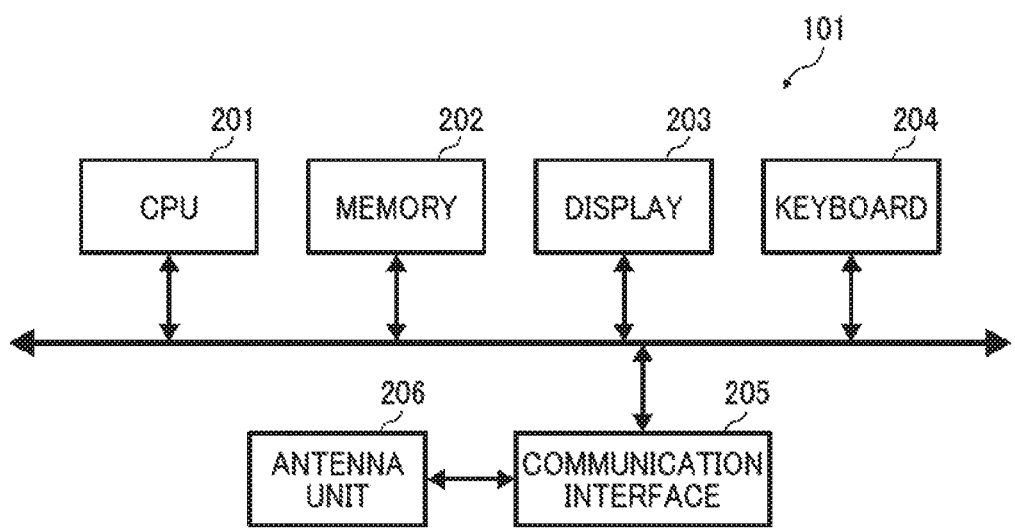
FIG. 2 is a diagram illustrating a hardware configuration of a communication apparatus 101 as an embodiment of the present invention.

FIG. 2 is a diagram illustrating a hardware configuration of a communication apparatus 101 in this embodiment. Since the communication apparatuses include a similar hardware configuration, the communication apparatus 101 in FIG. 2 is used as a representative in the description below.

The communication apparatus 101 includes a Central Processing Unit (CPU) 201, a memory 202, a display 203, a keyboard 204, a communication I/F 205, and an antenna unit 206

The CPU 201 implements functions in the communication apparatus 101 by executing programs etc. stored in the memory 202 (described later).

The memory 202 consists of storage devices such as a Read Only Memory (ROM) and a Random Access Memory (RAM). The memory 202 stores programs executed by the communication apparatus 101 (described later), communication data, and management information etc.

For example, the display 203 displays data regarding communication performed by the communication apparatus 101. It is possible that the display 203 is connected to a display I/F using a cable. The cable can be a cable for an analog RGB (VGA) signal, a cable for a component video, a cable for a High-Definition Multimedia Interface (HDMI) signal, or a cable for a Digital Video Interactive (DVI) signal.

The keyboard 204 accepts various inputs by user operation. For example, by operating the keyboard 204, it is possible to select a way of controlling the communication apparatus 101 based on the data displayed on the display 203 by user operation. The keyboard 204 can include various aspects as long as it can accept input by user operation. For example, the display 203 and the keyboard 204 can be unitary using a touch panel display.

The communication I/F 205 is an interface to communicate with another communication apparatus 10N, and it is possible to communicate with the other communication apparatuses 10N. In this embodiment, the communication apparatus 101 communicates with the other communication apparatus 10N using wireless communication. The communication I/F 205 includes not only a wireless communication interface but also a wired communication interface.

The antenna unit 206 is connected to the communication I/F 205 to perform wireless communication with the other communication apparatus 10N, and it is possible to communicate with the other communication apparatus 10N via the antenna unit 206.

The antenna unit 206 consists of an active antenna such as a phased-array antenna, and the antenna unit 206 is configurable from a nondirectional antenna or semi-nondirectional antenna to a narrow directional antenna. It is possible that the antenna unit 206 is configured as the semi-nondirectional antenna or nondirectional antenna to search for the counterpart communication apparatus. Subsequently, it is possible that the antenna unit 206 is configured as the directional antenna using a beam-forming function depending on the found counterpart. Otherwise, in case of less intervention, the antenna unit 206 can perform the wireless communication with the counterpart wireless communication apparatus without using the beam-forming function.

Next, a function implemented by the CPU 201 included in the communication apparatus 101 is described below.

Figure 3:
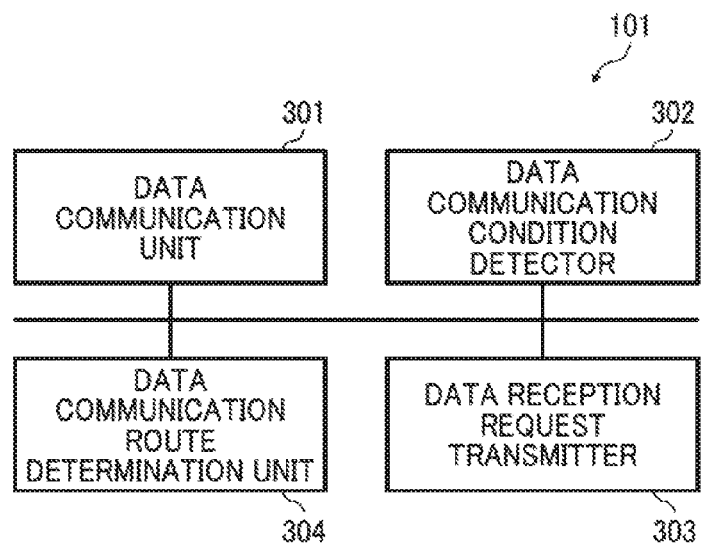
FIG. 3 is a diagram illustrating a function implemented by a CPU 201 as an embodiment of the present invention.

FIG. 3 is a diagram illustrating a function implemented by a CPU 201 in this embodiment. Since the communication apparatuses in FIG. 3 include a similar hardware configuration just like in FIG. 2, the communication apparatus 101 FIG. 3 is used as a representative in the description below.

A data communication unit 301, a data communication condition detector 302, a data reception request transmitter 303, and a data communication route determination unit (determining unit) 304 are functions implemented by the CPU 201.

The data communication unit 301, the data communication condition detector 302, the data reception request transmitter 303, and the data communication route determination unit 304 are implemented by executing programs stored in the memory 202 by the CPU 201.

The data communication unit 301 communicates content data with other communication apparatuses that construct the communication system via the antenna unit 206. In this case, image information and video information etc. processed by the communication apparatus 101 are the content data. The image information and the video information etc. are stored in the memory 202. The data communication unit 301 performs wireless communication with the other communication apparatus 10N using the wireless communication standard such as the EHF wireless communication.

The data communication condition detector 302 detects communication condition of the data communication performed by the data communication unit 301. For example, the data communication condition detector 302 detects the communication condition of the content data performed by the data communication unit 301 by monitoring communication radio field intensity and a type of the received data etc. For example, the data communication condition detector 302 detects that the communication of the content data performed by the data communication unit 301 is disconnected if the communication radio field intensity becomes less value than a predetermined threshold.

After the data communication condition detector 302 detects that the communication of the content data is disconnected, the data reception request transmitter 303 transfers a reception request for receiving the content data to the other communication apparatus 10N in the communication system.

The data communication route determination unit 304 determines communication route of communicating the content data in the communication system. The data communication unit 301 communicates the content data using the communication route determined by the data communication route determination unit 304. For example, after receiving the reception request for receiving the content data transferred by the data reception request transmitter 303 in the other communication apparatus 10N in the communication system, the data communication route determination unit 304 determines the communication route of transferring the content data received by the data communication unit 301 to the communication apparatus that transfers the reception request.

It is possible to divide or distribute the functions described above, the data communication unit 301, the data communication condition detector 302, the data reception request transmitter 303, and the data communication route determination unit 304, to complement with each other.

Next, a sequence of changing the communication route in the communication system in this embodiment is described below with reference to FIGS. 4 to 6.

Figure 4:
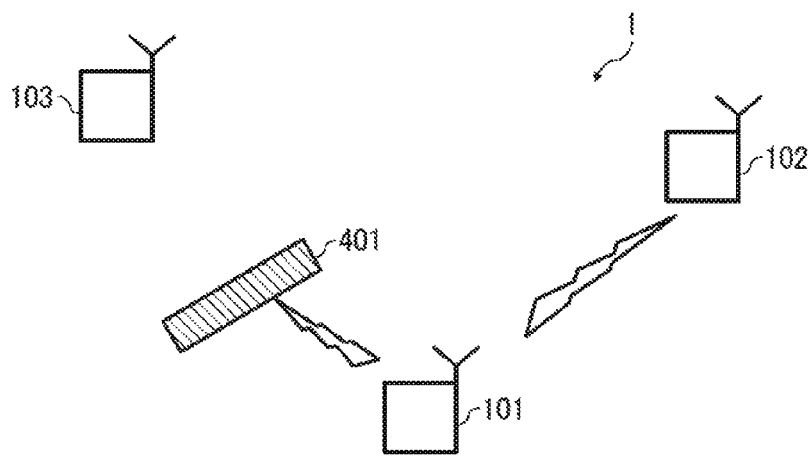
FIG. 4 is a diagram illustrating a status that a communication route is disconnected in the communication system as an embodiment of the present invention.

FIG. 4 is a diagram illustrating a status that a communication route is disconnected in the communication system in this embodiment. The communication apparatus 101 transfers the content data to the communication apparatuses 102 and 103. However, if an obstacle 401 appears on the communication route between the communication apparatuses 101 and 103 while the content data is transferred, the communication with the communication apparatus 103 is interrupted. Under the condition described above, the communication apparatus 103 cannot receive the content data transferred by the communication apparatus 101.

Figure 5:
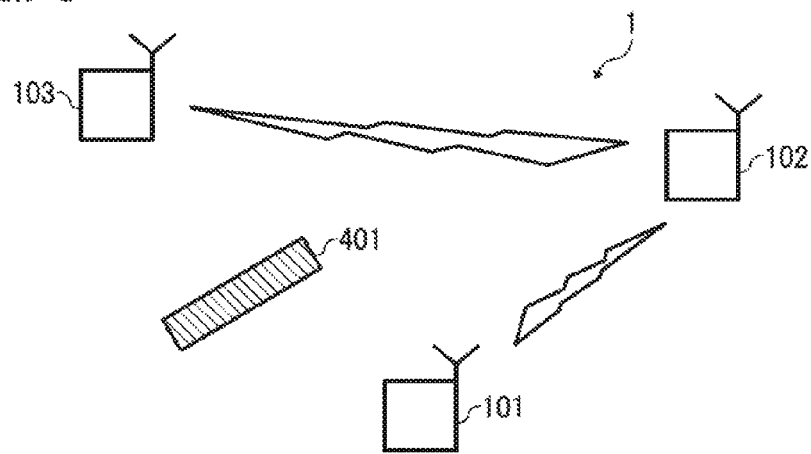
FIG. 5 is a diagram illustrating a status after changing the communication route in the communication system in FIG. 4 as an embodiment of the present invention.

To cope with this issue, as shown in FIG. 5, the communication route is changed dynamically using other communication apparatus that constructs the communication system 1 (e.g., the communication apparatus 102) to transfer the content data to the communication apparatus 103.

FIG. 5 is a diagram illustrating a status after changing the communication route in the communication system in FIG. 4 in this embodiment. After receiving the content data transferred by the communication apparatus 101, the communication apparatus 102 transfers the received content data to the communication apparatus 103. As described above, the communication apparatus 103 can receive the content data transferred by the communication apparatus 101 via the communication apparatus 102.

Figure 6C:
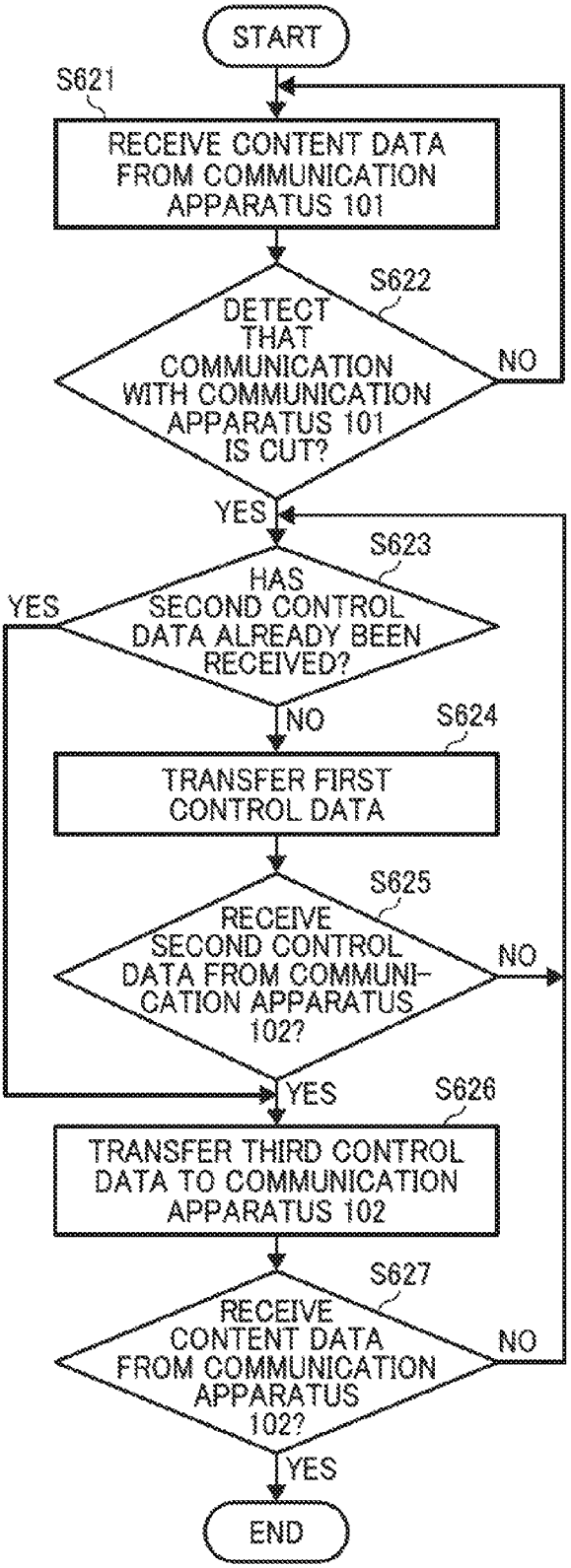

FIGS. 6A, 6B, and 6C are diagrams illustrating a sequence that changes the communication route in the communication system in the first embodiment. In FIGS. 6A, 6B, and 6C, procedures in the communication apparatuses 101, 102, and 103 shown in FIGS. 4 and 5 are illustrated.

The communication apparatus 101 transfers the content data to the communication apparatuses 102 and 103 using the data communication unit 301 in S601. The content data is transferred from the communication apparatus 101 to the communication apparatuses 102 and 103 by performing wireless communication whose directivity is controlled using the antenna unit 206. For example, the communication apparatuses 101, 102, and 103 construct the autonomous distributed mesh network using the EHF wireless communication.

Next, as shown in FIG. 4, if the obstacle 401 appears on the communication route between the communication apparatuses 101 and 103, the data communication condition detector 302 in the communication apparatus 101 detects that the communication with the communication apparatus 103 is disconnected in S602. For example, if the data communication condition detector 302 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 302 in the communication apparatus 101 can detect that the communication is disconnected if the communication radio field intensity becomes less value than the predetermined threshold.

After detecting that the communication with the communication apparatus 103 is disconnected (YES in S602), the communication apparatus 101 transfers the content data to the communication apparatus 102 in S603.

Next, a procedure in the communication apparatus 102 is described below with reference to steps S611 to S616.

The data communication unit 301 in the communication apparatus 102 receives the content data transferred by the communication apparatus 101 in S611.

Here, if the communication apparatus 102 receives reception control data (first control data) to control receiving the content data in case of disconnecting the communication with the communication apparatus 101 from the communication apparatus 103 (YES in S613), the communication apparatus 102 transfers communication route control data (second control data) to control the communication route with the communication apparatus 103 in S614. The communication rote control data includes information indicating that the reception control data is received in addition to apparatus identification information of the communication apparatus 102.

If the communication apparatus 102 has already received the reception control data (YES in S612), the communication route control data is not transferred to the communication apparatus 103.

Next, if the communication apparatus 102 receives reception response control data (third control data) as response of receiving the communication route control data from the communication apparatus 103 (YES in S615), the communication apparatus 102 transfers the content data transferred by the communication apparatus 101 to the communication apparatus 103 in S616.

Next, a procedure in the communication apparatus 103 is described below with reference to steps S621 to S627.

The data communication unit 301 in the communication apparatus 103 receives the content data transferred by the communication apparatus 101 in S621.

Next, as shown in FIG. 4, if the obstacle 401 appears on the communication route between the communication apparatuses 101 and 103, the data communication condition detector 302 in the communication apparatus 103 detects that the communication with the communication apparatus 101 is disconnected in S622. For example, it is possible to detect that the communication is disconnected if the communication apparatus 103 cannot receive the content data transferred by the communication apparatus 101. Otherwise, by monitoring the communication radio field intensity, the data communication condition detector 302 in the communication apparatus 103 can detect that the communication is disconnected if the communication radio field intensity becomes less value than the predetermined threshold.

In case of detecting that the communication with the communication apparatus 101 is disconnected (YES in S622), the communication apparatus 103 transfers the reception control data for controlling receiving the content data transferred by the communication apparatus 101 in S624. It is possible that the reception control data is transferred to other communication apparatuses in the communication system 1 using a broadcast frame. Otherwise, it is possible to transfer the reception control data to a designated counterpart communication apparatus (e.g., the communication apparatus 102). In case of transferring the reception control data designating the counterpart communication apparatus, it is possible that the reception control data includes the apparatus identification information of the counterpart communication apparatus (e.g., the communication apparatus 102).

Next, after receiving the communication route control data to control the communication route from the communication apparatus 102 (YES in S625), the communication apparatus 103 transfers the reception response control data as the response of receiving the communication route control data to the communication apparatus 102 in S626.

If the communication apparatus 103 detects that the communication with the communication apparatus 101 is disconnected (YES in S622) and has already received that the communication route control data for controlling the communication route (YES in S623), the communication apparatus 103 does not transfer the reception control data in S624, and the communication apparatus 103 transfers the reception response control data as the response of receiving the communication route control data to the communication apparatus that transferred the communication route control data.

The data communication unit 301 in the communication apparatus 103 receives the content data transferred by the communication apparatus 102 in S627.

As described above, even if the communication with the communication apparatus 101 is disconnected and the content data cannot be received, the communication apparatus 103 can change the communication route dynamically by transferring the reception control data for controlling receiving the content data transferred by the communication apparatus 101 to the other communication apparatus.

In the case described above, the communication between the communication apparatuses 101 and 103 is disconnected. However, if the communication between the communication apparatuses 101 and 102 is disconnected, the communication apparatus 102 can receive the data transferred by the communication apparatus 101 via the communication apparatus 103.

Embodiment 2

Figure 7A:
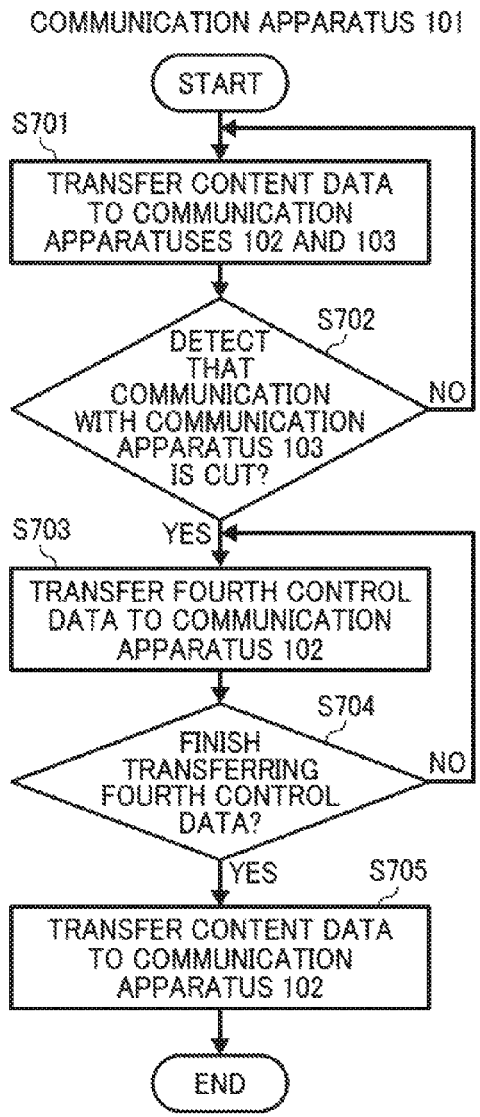
FIGS. 7A, 7B, and 7C are diagrams illustrating a sequence that changes the communication route in the communication system as a second embodiment of the present invention.
Figure 7B:
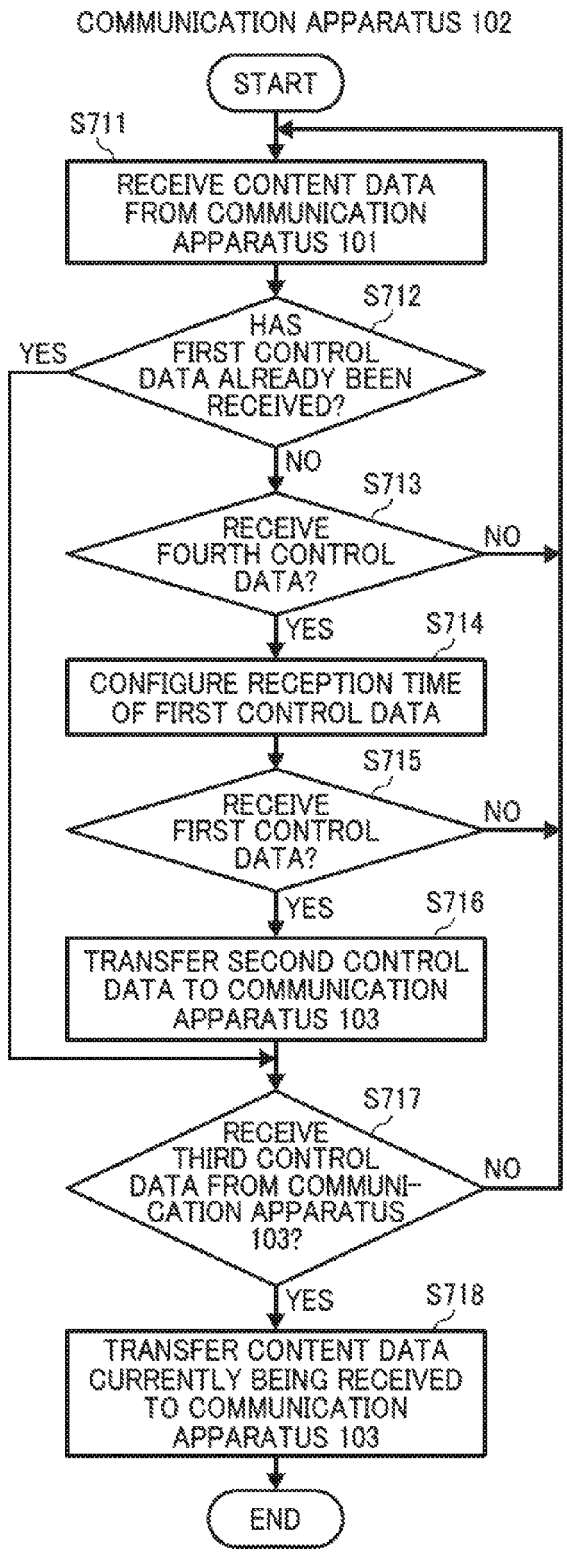
Figure 7C:
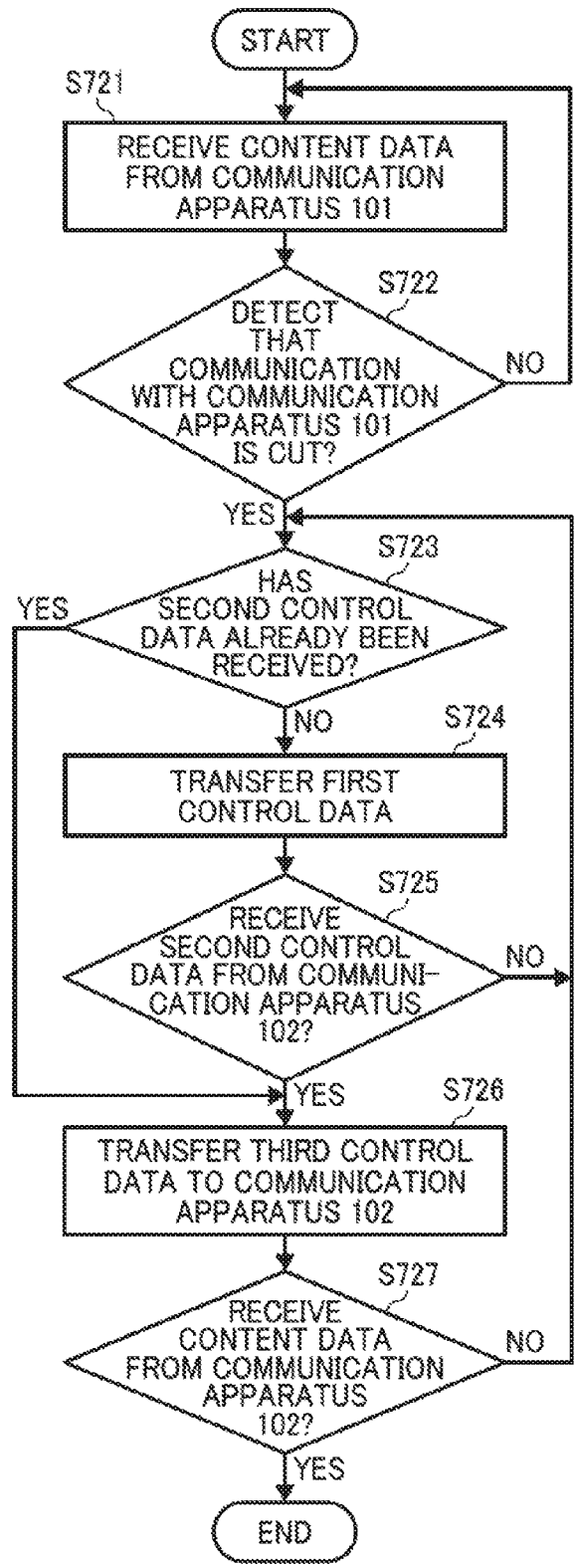

FIGS. 7A, 7B, and 7C are diagrams illustrating a sequence that changes the communication route in the communication system in the second embodiment. The case in FIGS. 7A, 7B, and 7C that the communication apparatus 101 requests carrier sense of the communication apparatus 102 if the communication apparatus 101 detects that the communication with the communication apparatus 103 is disconnected is different from the case in FIGS. 6A, 6B, and 6C. Hardware configurations and functions of the communication apparatuses 101, 102, and 103 are the same as the first embodiment.

The communication apparatus 101 transfers the content data to the communication apparatuses 102 and 103 using the data communication unit 301 in S701. The content data is transferred from the communication apparatus 101 to the communication apparatuses 102 and 103 by performing wireless communication whose directivity is controlled using the antenna unit 206. For example, the communication apparatuses 101, 102, and 103 construct the autonomous distributed mesh network using the EHF wireless communication.

Next, as shown in FIG. 4, if the obstacle 401 appears on the communication route between the communication apparatuses 101 and 103, the data communication condition detector 302 in the communication apparatus 101 detects that the communication with the communication apparatus 103 is disconnected in S702. For example, if the data communication condition detector 302 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 302 in the communication apparatus 101 can detect that the communication is disconnected if the communication radio field intensity becomes less value than the predetermined threshold.

After detecting that the communication with the communication apparatus 103 is disconnected (YES in S702), the communication apparatus 101 transfers reception time control data (fourth control data) for controlling allotting time for receiving the reception control data transferred by the communication apparatus 103 to the communication apparatus 102 in S703.

Next, after transferring the reception time control data (YES in S704), the data communication unit 301 in the communication apparatus 101 transfers the content data to the communication apparatus 102 in S705. It should be noted that the communication apparatus 101 considers that it is finished to transfer the reception time control data if a predetermined period of time elapses after transferring the reception control data.

Next, a procedure in the communication apparatus 102 is described below with reference to steps S711 to S718.

The data communication unit 301 in the communication apparatus 102 receives the content data transferred by the communication apparatus 101 in S711.

Here, if the communication apparatus 102 receives the reception time control data for controlling allotting the time for receiving the reception control data transferred by the communication apparatus 103 (YES in S713), the communication apparatus 102 configures the time for receiving the reception control data in S714.

If the communication apparatus 102 receives the reception control data for controlling receiving the content data if the communication with the communication apparatus 101 is disconnected from the communication apparatus 103 during the reception time configured in S714 (YES in S715), the communication apparatus 102 transfers the communication route control data for controlling the communication route between the communication apparatuses 102 and 103 to the communication apparatus 103 in S716. The communication rote control data includes information indicating that the reception control data is received in addition to apparatus identification information of the communication apparatus 102.

If the communication apparatus 102 has already received the reception control data (YES in S712), the time for receiving the reception control data is not configured and the communication route control data is not transferred to the communication apparatus 103.

Next, if the communication apparatus 102 receives the reception response control data as the response of receiving the communication route control data from the communication apparatus 103 (YES in 717), the communication apparatus 102 transfers the content data transferred by the communication apparatus 101 to the communication apparatus 103 in S718.

Next, a procedure in the communication apparatus 103 is described below with reference to steps S721 to S727.

The data communication unit 301 in the communication apparatus 103 receives the content data transferred by the communication apparatus 101 in S721.

Next, as shown in FIG. 4, if the obstacle 401 appears on the communication route between the communication apparatuses 101 and 103, the data communication condition detector 302 in the communication apparatus 103 detects that the communication with the communication apparatus 101 is disconnected in S722. For example, it is possible to detect that the communication is disconnected if the communication apparatus 103 cannot receive the content data transferred by the communication apparatus 101. Otherwise, by monitoring the communication radio field intensity, the data communication condition detector 302 in the communication apparatus 103 can detect that the communication is disconnected if the communication radio field intensity becomes less value than the predetermined threshold.

In case of detecting that the communication with the communication apparatus 101 is disconnected (YES in S722), the communication apparatus 103 transfers the reception control data for controlling receiving the content data transferred by the communication apparatus 101 in S724.

It is possible that the reception control data is transferred to other communication apparatuses in the communication system 1 using a broadcast frame. Otherwise, it is possible to transfer the reception control data to a designated counterpart communication apparatus (e.g., the communication apparatus 102). In case of transferring the reception control data designating the counterpart communication apparatus, it is possible that the reception control data includes the apparatus identification information of the counterpart communication apparatus (e.g., the communication apparatus 102).

Next, after receiving the communication route control data to control the communication route from the communication apparatus 102 (YES in S725), the communication apparatus 103 transfers the reception response control data as the response of receiving the communication route control data to the communication apparatus 102 in S726.

If the communication apparatus 103 detects that the communication with the communication apparatus 101 is disconnected (YES in S722) and has already received that the communication route control data for controlling the communication route (YES in S723), the communication apparatus 103 does not transfer the reception control data in S724, and the communication apparatus 103 transfers the reception response control data as the response of receiving the communication route control data to the communication apparatus that transferred the communication route control data.

The data communication unit 301 in the communication apparatus 103 receives the content data transferred by the communication apparatus 102 in S727.

As described above, by allotting the time for receiving the reception control data transferred by the communication apparatus 103 whose communication with the communication apparatus 101 is disconnected, the communication apparatus 102 can transfer the content data to the communication apparatus 103 and change the communication route dynamically.

Embodiment 3

A configuration in this embodiment is described below. In this embodiment, the EHF band wireless communication technology (i.e., WiGig and IEEE 802.11ad) is used as the wireless communication method.

First, a specification standardized by WiGig and IEEE 802.11ad is described below. In the below description, the EHF wireless communication indicates the wireless communication standardized by WiGig and IEEE 802.11ad.

The EHF wireless communication uses 60 GHz wireless band and a directional antenna with very strong directivity. Since radio wave is not radiated to all directions in the EHF wireless communication, it is possible that some of wireless communication apparatuses are not detected. As a result, the EHF wireless communication cannot use a CSMA/CA protocol of the wireless LAN (IEEE 802.11e) using the microwave band.

To cope with this issue, the EHF wireless communication uses a TDMA communication protocol using a band reserved preliminarily. In addition, in the EHF wireless communication, a coordinator called PBSS Central Point (PCP) is determined within Personal Basic Service Set (PBSS) as a network cell. The PCP manages time slots in the TDMA protocol.

FIG. 8 is a diagram illustrating allocation of time slots in the TDMA communication protocol.

Time slots in FIG. 8 are allocated to Beacon Header Interval (BHI) and Data Transfer Interval (DTI).

The BHI includes Beacon Transmission Interval (BTI), Association Beam Forming Training (A-BFT), and Announcement Transmission Interval (ATI).

In the BTI, the PCP transfers beacon frames as many as the number of its own antenna sectors. The A-BFT is a period for improving accuracy of beam-forming. The ATI is a period that management information and control information are exchanged between the PCP device and the non-PCP device.

The DTI includes Contention Based Access Period (CBAP) and Service Period (SP).

The CBAP is a period that devices perform wireless communication using a competition channel access method. The SP is a reserved period that a pair of wireless devices communicates with each other.

In the EHF wireless communication using the TDMA protocol in FIG. 8, the PCP transfers beacon frames as many as the number of its own antennas and the number of antenna sectors using the BTI. The other communication apparatuses within the PBSS receive all beacon frames. The other communication apparatuses within the PBSS determine an antenna ID and an antenna sector ID whose reception quality is the best based on the received beacon frames. The other communication apparatuses within the PBSS feedback the determined antenna ID and the antenna sector ID to the PCP. As a result, the PCP can grasp which antenna sector to use to perform wireless communication.

Next, a function implemented by the CPU 201 included in the communication apparatus 101 in this embodiment is described below. FIG. 9 is a diagram illustrating a function implemented by the CPU 201 in the communication apparatus 101 in this embodiment. Hardware configurations of the communication apparatuses 101, 102, and 103 are the same as the first embodiment. Since the communication apparatuses in FIG. 9 include a similar hardware configuration, the communication apparatus 101 is used as a representative in the description below.

A data communication unit 901, a data communication condition detector 902, a beacon frame transmitter 903, and a data communication route determination unit 904 are implemented by the CPU 201 included in the communication apparatus 101 in this embodiment.

The data communication unit 901, the data communication condition detector 902, the beacon frame transmitter 903, and the data communication route determination unit 904 are implemented by executing programs stored in the memory 202 by the CPU 201.

The data communication unit 901 communicates content data with other communication apparatuses that construct the communication system via the antenna unit 206.

In this case, image information and video information etc. processed by the communication apparatus 101 are the content data. The image information and the video information etc. are stored in the memory 202. The data communication unit 901 performs wireless communication with the other communication apparatus 10N using the wireless communication standard such as the EHF wireless communication.

The data communication condition detector 902 detects communication condition of the data communication performed by the data communication unit 901. For example, the data communication condition detector 902 detects the communication condition of the content data performed by the data communication unit 901 by monitoring communication radio field intensity and a type of the received data etc. For example, the data communication condition detector 902 detects that the communication of the content data performed by the data communication unit 901 is disconnected if the communication radio field intensity becomes less value than a predetermined threshold.

If the data communication condition detector 902 detects that the content data communication is disconnected, the beacon frame transmitter 903 transfers the beacon frame to the other communication apparatus 10N in the communication system.

The data communication route determination unit 904 determines communication route of communicating the content data in the communication system. The data communication unit 901 communicates the content data using the communication route determined by the data communication route determination unit 904. For example, after receiving the beacon frame transferred by the beacon frame transmitter 903 in the other communication apparatus, the data communication route determination unit 904 determines the communication route of transferring the content data received by the data communication unit 901 to the other communication apparatus that transfers the beacon frame.

It is possible to divide or distribute the functions described above, the data communication unit 901, the data communication condition detector 902, the beacon frame transmitter 903, and the data communication route determination unit 904, to complement with each other.

FIG. 10 is a diagram illustrating allocation of time slots in this embodiment.

The communication apparatus 102 determines the time of receiving the beacon frame transferred by the communication apparatus 103 that does not overlap with a period of time of communicating the content data with the communication apparatus 101.

In addition, the time of communicating the content data between the communication apparatuses 102 and 103 is configured so that it does not overlap with a period of time of communicating the content data between the communication apparatuses 101 and 102 and a period of time of transferring the beacon frame.

As described above, the period of time of transferring beacon do not overlap with each other. In addition, by processing hopping, the communication apparatus 102 can distribute the content data again.

Figure 11C:
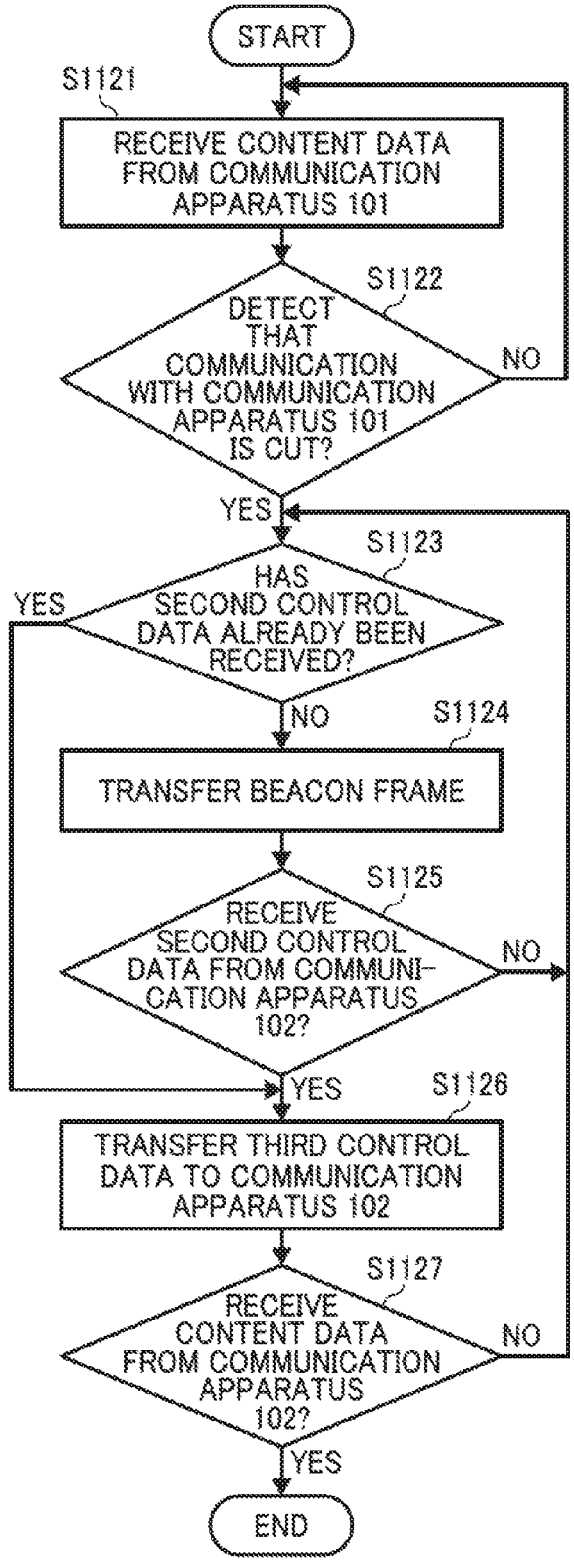

FIGS. 11A, 11B, and 11C are diagrams illustrating a sequence that changes the communication route in the communication system in the third embodiment.

The communication apparatus 101 transfers the content data to the communication apparatuses 102 and 103 using the data communication unit 901 in S1101. The content data is transferred from the communication apparatus 101 to the communication apparatuses 102 and 103 by performing wireless communication whose directivity is controlled using the antenna unit 206. For example, the communication apparatuses 101, 102, and 103 construct the autonomous distributed mesh network using the EHF wireless communication.

Next, as shown in FIG. 4, if the obstacle 401 appears on the communication route between the communication apparatuses 101 and 103, the data communication condition detector 902 in the communication apparatus 101 detects that the communication with the communication apparatus 103 is disconnected in S1102. For example, if the data communication condition detector 902 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 902 in the communication apparatus 101 can detect that the communication is disconnected if the communication radio field intensity becomes less value than the predetermined threshold.

After detecting that the communication with the communication apparatus 103 is disconnected (YES in S1102), the communication apparatus 101 transfers beacon reception time control data (fifth control data) for controlling allotting time for receiving the beacon frame transferred by the communication apparatus 103 to the communication apparatus 102 in S1103.

Next, after determining that the beacon period specified in S1103 elapses (YES in S1104), the data communication unit 901 in the communication apparatus 101 transfers the content data to the communication apparatus 102 in S1105.

Next, a procedure in the communication apparatus 102 is described below with reference to steps S1111 to S1118.

The data communication unit 901 in the communication apparatus 102 receives the content data transferred by the communication apparatus 101 in S1111.

Here, if the communication apparatus 102 receives the beacon reception time control data for controlling allotting the time for receiving the beacon frame transferred by the communication apparatus 103 (YES in S1113), the communication apparatus 102 configures the time for receiving the beacon frame in S1114.

If the communication apparatus 102 receives the beacon frame during the beacon frame reception time configured in S1114 (YES in S1115), the communication apparatus 102 transfers the communication route control data for controlling the communication route between the communication apparatuses 102 and 103 to the communication apparatus 103 in S1116. The communication rote control data includes information indicating that the beacon frame is received in addition to apparatus identification information of the communication apparatus 102.

If the communication apparatus 102 has already received the beacon frame (YES in S1112), the time for receiving the beacon frame is not configured and the communication route control data is not transferred to the communication apparatus 103.

Next, if the communication apparatus 102 receives the reception response control data as the response of receiving the communication route control data from the communication apparatus 103 (YES in 1117), the communication apparatus 102 transfers the content data transferred by the communication apparatus 101 to the communication apparatus 103 in S1118.

Next, a procedure in the communication apparatus 103 is described below with reference to steps S1121 to S1127.

The data communication unit 301 in the communication apparatus 103 receives the content data transferred by the communication apparatus 101 in S1121.

Next, as shown in FIG. 4, if the obstacle 401 appears on the communication route between the communication apparatuses 101 and 103, the data communication condition detector 902 in the communication apparatus 103 detects that the communication with the communication apparatus 101 is disconnected in S1122. For example, it is possible to detect that the communication is disconnected if the communication apparatus 103 cannot receive the content data transferred by the communication apparatus 101. Otherwise, by monitoring the communication radio field intensity, the data communication condition detector 902 in the communication apparatus 103 can detect that the communication is disconnected if the communication radio field intensity becomes less value than the predetermined threshold.

In case of detecting that the communication with the communication apparatus 101 is disconnected (YES in S1122), the communication apparatus 103 transfers the beacon frame in S1124.

Next, after receiving the communication route control data to control the communication route from the communication apparatus 102 (YES in S1125), the communication apparatus 103 transfers the reception response control data as the response of receiving the communication route control data to the communication apparatus 102 in S1126.

If the communication apparatus 103 detects that the communication with the communication apparatus 101 is disconnected (YES in S1122) and has already received that the communication route control data for controlling the communication route (YES in S1123), the communication apparatus 103 does not transfer the beacon frame in S1124, and the communication apparatus 103 transfers the reception response control data as the response of receiving the communication route control data to the communication apparatus that transferred the communication route control data.

The data communication unit 901 in the communication apparatus 103 receives the content data transferred by the communication apparatus 102 in S1127.

As described above, if the communication with the communication apparatus 101 is disconnected, the communication apparatus 103 transfers the beacon frame, and the communication apparatus 102 receives the beacon frame during the designated beacon reception period. Consequently, it is possible to change the communication route dynamically without affecting the transfer of the content data.

Embodiment 4

A configuration in this embodiment is described below. In this embodiment, the communication system includes four communication apparatuses, i.e., communication apparatuses 101 to 104.

Figure 12:
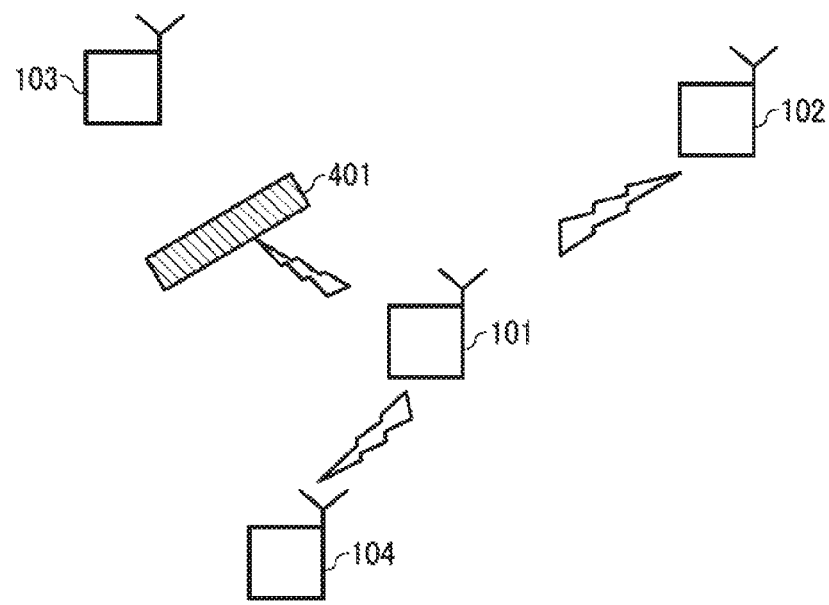
FIG. 12 is a diagram illustrating a status that a communication route is disconnected in the communication system as a fourth embodiment of the present invention.

FIG. 12 is a diagram illustrating a status that a communication route is disconnected in the communication system in this embodiment. The communication apparatus 101 transfers the content data to the communication apparatuses 102 to 104. However, if an obstacle 401 appears on the communication route between the communication apparatuses 101 and 103 while the content data is transferred, the communication with the communication apparatus 103 is interrupted. Under the condition described above, the communication apparatus 103 cannot receive the content data transferred by the communication apparatus 101.

To cope with this issue, the communication route is changed dynamically using other communication apparatus that constructs the communication system (i.e., the communication apparatus 102 or the communication apparatus 104) to transfer the content data to the communication apparatus 103.

Figure 13:
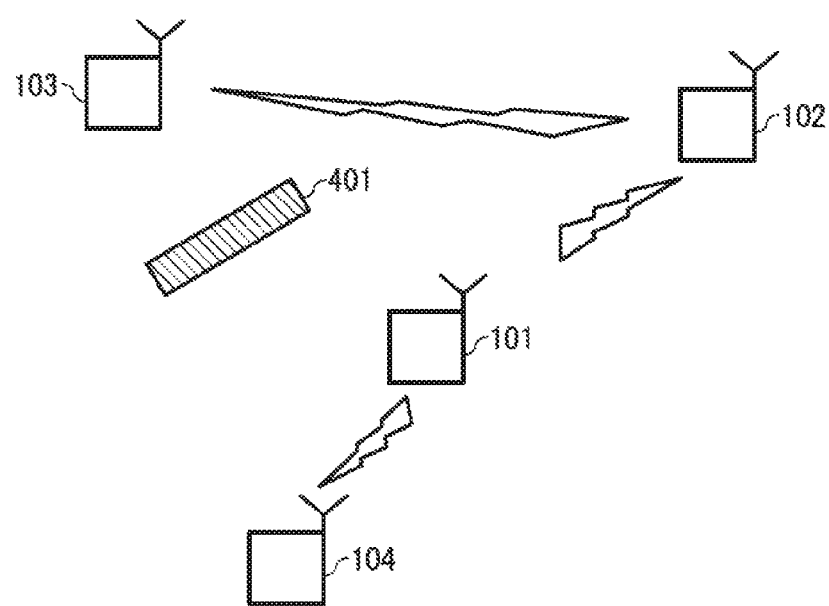
FIG. 13 is a diagram illustrating a status after changing the communication route in the communication system in FIG. 12.
Figure 15C:
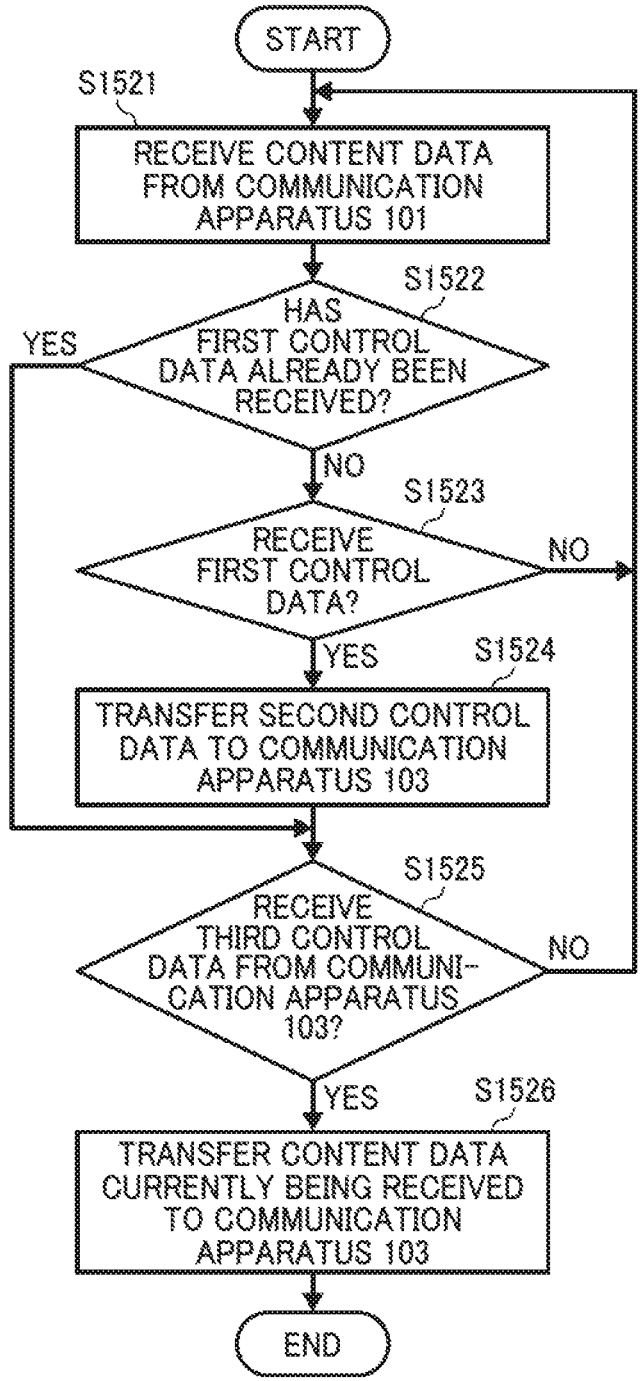

FIG. 13 is a diagram illustrating a status after changing the communication route in the communication system in FIG. 12. After receiving the content data transferred by the communication apparatus 101, the communication apparatus 102 transfers the received content data to the communication apparatus 103. As described above, the communication apparatus 103 can receive the content data transferred by the communication apparatus 101 via the communication apparatus 102.

Next, a function implemented by the CPU 201 included in the communication apparatus 101 in this embodiment is described below. FIG. 14 is a diagram illustrating a function implemented by the CPU 201 in the communication apparatus 101 in this embodiment. Hardware configurations of the communication apparatuses 101, 102, 103, and 104 are the same as the first embodiment. Since the communication apparatuses in FIG. 14 include similar functions, the communication apparatus 101 is used as a representative in the description below.

A data communication unit 1401, a data communication condition detector 1402, a data reception request transmitter 1403, a data communication route determination unit 1404, and a data communication condition comparator 1405 are implemented by the CPU 201 included in the communication apparatus 101 in this embodiment.

The data communication unit 1401, the data communication condition detector 1402, the data reception request transmitter 1403, the data communication route determination unit 1404, and the data communication condition comparator 1405 are implemented by executing programs stored in the memory 202 by the CPU 201.

The data communication unit 1401 communicates content data with other communication apparatuses that construct the communication system via the antenna unit 206. In this case, image information and video information etc. processed by the communication apparatus 101 are the content data. The image information and the video information etc. are stored in the memory 202. The data communication unit 1401 performs wireless communication with the other communication apparatus 10N using the wireless communication standard such as the EHF wireless communication.

The data communication condition detector 1402 detects communication condition of the data communication performed by the data communication unit 1401. For example, the data communication condition detector 1402 detects the communication condition of the content data performed by the data communication unit 1401 by monitoring communication radio field intensity and a type of the received data etc. For example, the data communication condition detector 1402 detects that the communication of the content data performed by the data communication unit 1401 is disconnected if the communication radio field intensity becomes less value than a predetermined threshold.

After the data communication condition detector 1402 detects that the communication of the content data is disconnected, the data reception request transmitter 1403 transfers a reception request for receiving the content data to the other communication apparatus 10N in the communication system.

The data communication route determination unit 1404 determines communication route of communicating the content data in the communication system. The data communication unit 1401 communicates the content data using the communication route determined by the data communication route determination unit 1404. For example, after receiving the reception request for receiving the content data transferred by the data reception request transmitter 1403 in the other communication apparatus 10N in the communication system, the data communication route determination unit 1404 determines the communication route of transferring the content data received by the data communication unit 1401 to the communication apparatus that transfers the reception request.

The data communication condition comparator 1405 compares communication conditions in multiple communication routes. For example, the data communication condition comparator 1405 compares a communication condition of the content data in the communication route between the communication apparatuses 102 and 103 (i.e., a communication route A) with a communication condition of the content data in the communication route between the communication apparatuses 103 and 104 (i.e., a communication route B). For example, in comparing the communication condition of the content data, communication radio field intensity in the communication route A is compared with communication radio field intensity in the communication route B.

In addition, the data communication route determination unit 1404 determines the communication route used for communicating the content data using the comparison result by the data communication condition comparator 1405. For example, among the communication routes compared by the data communication condition comparator 1405, the data communication route determination unit 1404 determines the communication route whose communication radio field intensity is higher as the communication route used for communicating the content data.

It is possible to divide or distribute the functions described above, the data communication unit 1401, the data communication condition detector 1402, the data reception request transmitter 1403, the data communication route determination unit 1404, and the data communication condition comparator 1405, to complement with each other.

FIGS. 15A, 15B, 15C, and 15D are diagrams illustrating a sequence that changes the communication route in the communication system in the fourth embodiment. In FIGS. 15A, 15B, 15C, and 15D, procedures in the communication apparatuses 101, 102, 103, and 104 shown in FIGS. 12 and 13 are illustrated.

The communication apparatus 101 transfers the content data to the communication apparatuses 102, 103 and 104 using the data communication unit 1401 in S1501. The content data is transferred from the communication apparatus 101 to the communication apparatuses 102 to 104 by performing wireless communication whose directivity is controlled using the antenna unit 206. For example, the communication apparatuses 101, 102, 103, and 104 construct the autonomous distributed mesh network using the EHF wireless communication.

Next, as shown in FIG. 12, if the obstacle 401 appears on the communication route between the communication apparatuses 101 and 103, the data communication condition detector 1402 in the communication apparatus 101 detects that the communication with the communication apparatus 103 is disconnected in S1502. For example, if the data communication condition detector 1402 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 1402 in the communication apparatus 101 can detect that the communication is disconnected if the communication radio field intensity becomes less value than the predetermined threshold.

If the communication apparatus 101 detects that the communication with the communication apparatus 103 is disconnected (YES in S1502), the communication apparatus 101 transfers the content data to the communication apparatuses 102 and 104 in S1503.

Next, a procedure in the communication apparatus 102 is described below with reference to steps S1511 to S1516.

The data communication unit 1401 in the communication apparatus 102 receives the content data transferred by the communication apparatus 101 in S1511.

Here, if the communication apparatus 102 receives the reception control data for controlling receiving the content data if the communication with the communication apparatus 101 is disconnected from the communication apparatus 103 (YES in S1513), the communication apparatus 102 transfers the communication route control data for controlling the communication route between the communication apparatuses 102 and 103 to the communication apparatus 103 in S1514. The communication rote control data includes information indicating that the reception control data is received in addition to apparatus identification information of the communication apparatus 102.

If the communication apparatus 102 has already received the reception control data (YES in S1512), the communication route control data is not transferred to the communication apparatus 103.

Next, if the communication apparatus 102 receives the reception response control data as the response of receiving the communication route control data from the communication apparatus 103 (YES in 1515), the communication apparatus 102 transfers the content data transferred by the communication apparatus 101 to the communication apparatus 103 in S1516.

Next, a procedure in the communication apparatus 104 is described below with reference to steps S1521 to S1526.

The data communication unit 1401 in the communication apparatus 104 receives the content data transferred by the communication apparatus 101 in S1521.

Here, if the communication apparatus 104 receives the reception control data for controlling receiving the content data if the communication with the communication apparatus 101 is disconnected from the communication apparatus 103 (YES in S1523), the communication apparatus 104 transfers the communication route control data for controlling the communication route between the communication apparatuses 104 and 103 to the communication apparatus 103 in S1524. The communication rote control data includes information indicating that the reception control data is received in addition to apparatus identification information of the communication apparatus 104.

If the communication apparatus 104 has already received the reception control data (YES in S1522), the communication route control data is not transferred to the communication apparatus 103.

Next, if the communication apparatus 104 receives the reception response control data as the response of receiving the communication route control data from the communication apparatus 103 (YES in 1525), the communication apparatus 104 transfers the content data transferred by the communication apparatus 101 to the communication apparatus 103 in S1526.

Next, a procedure in the communication apparatus 103 is described below with reference to steps S1531 to S1540.

The data communication unit 1401 in the communication apparatus 103 receives the content data transferred by the communication apparatus 101 in S1531.

Next, as shown in FIG. 12, if the obstacle 401 appears on the communication route between the communication apparatuses 101 and 103, the data communication condition detector 1402 in the communication apparatus 103 detects that the communication with the communication apparatus 101 is disconnected in S1532. For example, it is possible to detect that the communication is disconnected if the communication apparatus 103 cannot receive the content data transferred by the communication apparatus 101. Otherwise, by monitoring the communication radio field intensity, the data communication condition detector 1402 in the communication apparatus 103 can detect that the communication is disconnected if the communication radio field intensity becomes less value than the predetermined threshold.

In case of detecting that the communication with the communication apparatus 101 is disconnected (YES in S1532), the communication apparatus 103 transfers the reception control data for controlling receiving the content data transferred by the communication apparatus 101 in 51534. It is possible that the reception control data is transferred to other communication apparatuses in the communication system 1 using a broadcast frame. Otherwise, it is possible to transfer the reception control data to a designated counterpart communication apparatus (e.g., the communication apparatuses 102 and 104). In case of transferring the reception control data designating the counterpart communication apparatus, it is possible that the reception control data includes the apparatus identification information of the counterpart communication apparatus (e.g., the communication apparatuses 102 and 104).

Next, after receiving the communication route control data to control the communication route from the communication apparatuses 102 and 104 (YES in S1535), the data communication condition comparator 1405 in the communication apparatus 103 compares the communication condition between the communication apparatuses 102 and 103 with the communication condition between the communication apparatuses 103 and 104 based on the communication route control data received from the communication apparatuses 102 and 104 in S1536.

If the data communication condition comparator 1405 determines that the communication condition with the communication apparatus 102 is better (YES in S1537), the communication apparatus 103 transfers the reception response control data as the response of receiving the communication route control data to the communication apparatus 102 in S1538.

If the data communication condition comparator 1405 determines that the communication condition with the communication apparatus 104 is better (NO in S1537), the communication apparatus 103 transfers the reception response control data as the response of receiving the communication route control data to the communication apparatus 104 in S1539.

After that, the communication apparatus 103 receives the content data transferred by the communication apparatus 102 or the communication apparatus 104 in S1540.

As described above, if the communication between the communication apparatuses 101 and 103 is disconnected and the communication apparatus 103 cannot receive the content data, the communication apparatus 103 can receive the content data from the communication apparatus that has the communication route with better communication condition by comparing the communication condition between the communication apparatuses 102 and 103 with the communication condition between the communication apparatuses 103 and 104 and determine the most appropriate communication route to receive the content data.

Embodiment 5

A configuration in this embodiment is described below. In this embodiment, communication between the communication apparatuses 101 and 103 is resumed after the communication between the communication apparatuses 101 and 103 is disconnected as shown in the embodiments 1 to 4.

Figure 16:
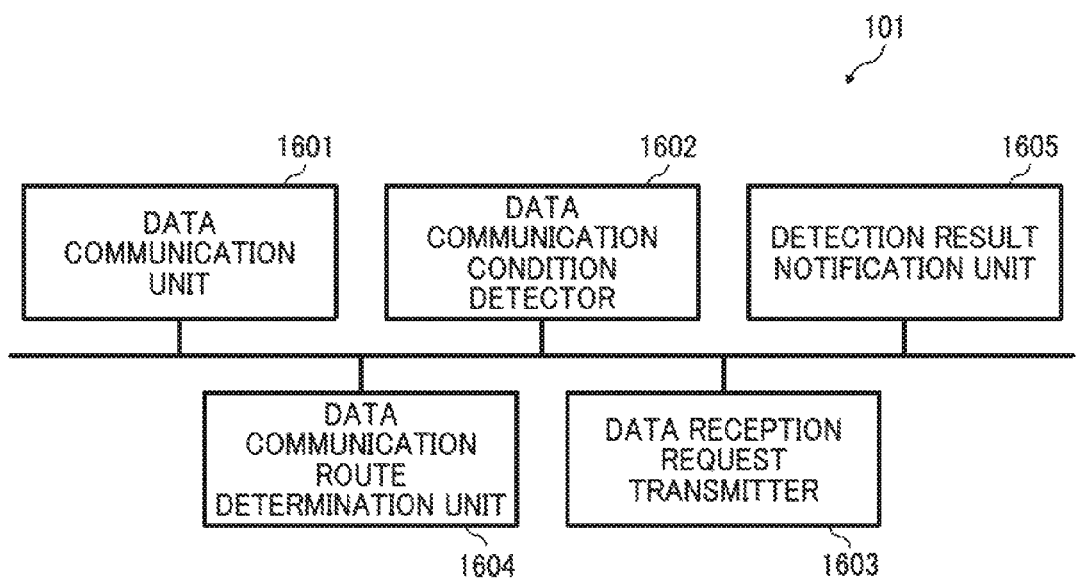
FIG. 16 is a diagram illustrating a function implemented by the CPU 201 in the communication apparatus 101 as a fifth embodiment of the present invention.

FIG. 16 is a diagram illustrating a function implemented by the CPU 201 in the communication apparatus 101 in this embodiment. Hardware configurations of the communication apparatuses 101, 102, and 103 are the same as the first embodiment. Since the communication apparatuses in FIG. 16 include similar functions, the communication apparatus 101 is used as a representative in the description below.

A data communication unit 1601, a data communication condition detector 1602, a data reception request transmitter 1603, a data communication route determination unit 1604, and a detection result notification unit 1605 are implemented by the CPU 201 included in the communication apparatus 101 in this embodiment.

The data communication unit 1601, the data communication condition detector 1602, the data reception request transmitter 1603, the data communication route determination unit 1604, and the detection result notification unit 1605 are implemented by executing programs stored in the memory 202 by the CPU 201.

The data communication unit 1601 communicates content data with other communication apparatuses that construct the communication system via the antenna unit 206. In this case, image information and video information etc. processed by the communication apparatus 101 are the content data. The image information and the video information etc. are stored in the memory 202. The data communication unit 1601 performs wireless communication with the other communication apparatus 10N using the wireless communication standard such as the ETF wireless communication.

The data communication condition detector 1602 detects communication condition of the data communication performed by the data communication unit 1601. For example, the data communication condition detector 1602 detects the communication condition of the content data performed by the data communication unit 1601 by monitoring communication radio field intensity and a type of the received data etc. For example, the data communication condition detector 1602 detects that the communication of the content data performed by the data communication unit 1601 is disconnected if the communication radio field intensity becomes less value than a predetermined threshold.

After the data communication condition detector 1602 detects that the communication of the content data is disconnected, the data reception request transmitter 1603 transfers a reception request for receiving the content data to the other communication apparatus 10N in the communication system.

The data communication route determination unit 1604 determines communication route of communicating the content data in the communication system. The data communication unit 1601 communicates the content data using the communication route determined by the data communication route determination unit 1604. For example, after receiving the reception request for receiving the content data transferred by the data reception request transmitter 1603 in the other communication apparatus 10N in the communication system, the data communication route determination unit 1604 determines the communication route of transferring the content data received by the data communication unit 1601 to the communication apparatus that transfers the reception request.

The detection result notification unit 1605 notifies the other communication apparatus 10N in the communication system of a result of detecting the communication condition of the data communication by the data communication condition detector 1602.

It is possible to divide or distribute the functions described above, the data communication unit 1601, the data communication condition detector 1602, the data reception request transmitter 1603, the data communication route determination unit 1604, and the detection result notification unit 1605, to complement with each other.

Figure 17B:
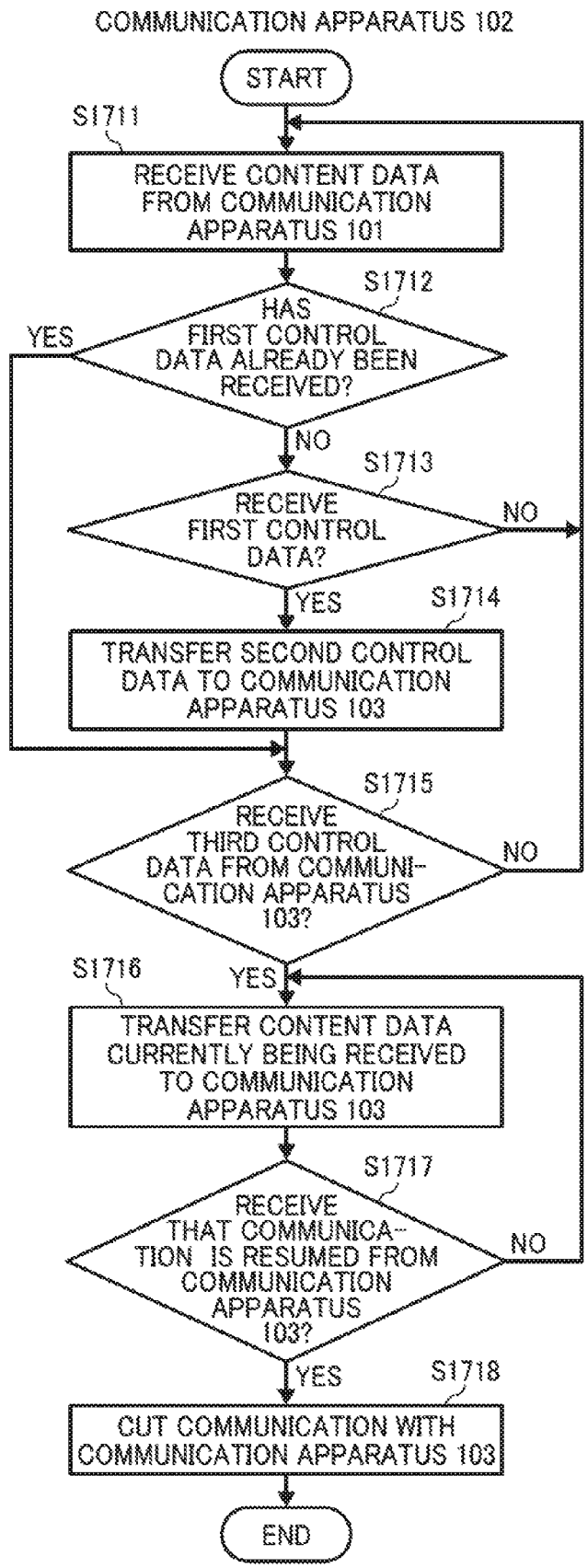

FIGS. 17A, 17B, and 17C are diagrams illustrating a sequence that changes the communication route in the communication system in the fifth embodiment.

The communication apparatus 101 transfers the content data to the communication apparatuses 102 and 103 using the data communication unit 1601 in S1701. The content data is transferred from the communication apparatus 101 to the communication apparatuses 102 and 103 by performing wireless communication whose directivity is controlled using the antenna unit 206. For example, the communication apparatuses 101, 102, and 103 construct the autonomous distributed mesh network using the EHF wireless communication.

Next, as shown in FIG. 4, if the obstacle 401 appears on the communication route between the communication apparatuses 101 and 103, the data communication condition detector 1602 in the communication apparatus 101 detects that the communication with the communication apparatus 103 is disconnected in S1702. For example, if the data communication condition detector 1602 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 1602 in the communication apparatus 101 can detect that the communication is disconnected if the communication radio field intensity becomes less value than the predetermined threshold.

If the communication apparatus 101 detects that the communication with the communication apparatus 103 is disconnected (YES in S1702), the communication apparatus 101 transfers the content data to the communication apparatus 102 in S1703.

In this case, if the communication apparatus 101 detects that the communication with the communication apparatus 103 is resumed (YES in S1704), the communication apparatus 101 transfers the content data to the communication apparatus 103 in S1705.

Next, a procedure in the communication apparatus 102 is described below with reference to steps S1711 to S1718.

The data communication unit 1601 in the communication apparatus 102 receives the content data transferred by the communication apparatus 101 in S1711.

Here, if the communication apparatus 102 receives the reception control data for controlling receiving the content data if the communication with the communication apparatus 101 is disconnected from the communication apparatus 103 (YES in S1713), the communication apparatus 102 transfers the communication route control data for controlling the communication route between the communication apparatuses 102 and 103 to the communication apparatus 103 in S1714. The communication rote control data includes information indicating that the reception control data is received in addition to apparatus identification information of the communication apparatus 102.

If the communication apparatus 102 has already received the reception control data (YES in S1712), the communication route control data is not transferred to the communication apparatus 103.

Next, if the communication apparatus 102 receives the reception response control data as the response of receiving the communication route control data from the communication apparatus 103 (YES in 1715), the communication apparatus 102 transfers the content data transferred by the communication apparatus 101 to the communication apparatus 103 in S1716.

Here, if the communication apparatus 102 receives communication resuming notification indicating that the communication with the communication apparatus 101 is resumed from the detection result notification unit 1605 in the communication apparatus 103 (YES in S1717), the communication apparatus 102 disconnects the communication with the communication apparatus 103 in S1718.

Next, a procedure in the communication apparatus 103 is described below with reference to steps S1721 to S1730.

The data communication unit 1601 in the communication apparatus 103 receives the content data transferred by the communication apparatus 101 in S1721.

Next, as shown in FIG. 12, if the obstacle 401 appears on the communication route between the communication apparatuses 101 and 103, the data communication condition detector 1602 in the communication apparatus 101 detects that the communication with the communication apparatus 103 is disconnected in S1722. For example, it is possible to detect that the communication is disconnected if the communication apparatus 103 cannot receive the content data transferred by the communication apparatus 101. Otherwise, by monitoring the communication radio field intensity, the data communication condition detector 1602 in the communication apparatus 103 can detect that the communication is disconnected if the communication radio field intensity becomes less value than the predetermined threshold.

In case of detecting that the communication with the communication apparatus 101 is disconnected (YES in S1722), the communication apparatus 103 transfers the reception control data for controlling receiving the content data transferred by the communication apparatus 101 in S1724.

It is possible that the reception control data is transferred to other communication apparatuses in the communication system using a broadcast frame. Otherwise, it is possible to transfer the reception control data to a designated counterpart communication apparatus (e.g., the communication apparatus 102). In case of transferring the reception control data designating the counterpart communication apparatus, it is possible that the reception control data includes the apparatus identification information of the counterpart communication apparatus (e.g., the communication apparatus 102).

Next, after receiving the communication route control data to control the communication route from the communication apparatus 102 (YES in S1725), the communication apparatus 103 transfers the reception response control data as the response of receiving the communication route control data to the communication apparatus 102 in S1726.

If the communication apparatus 103 detects that the communication with the communication apparatus 101 is disconnected (YES in S1722) and has already received that the communication route control data for controlling the communication route (YES in S1723), the communication apparatus 103 does not transfer the reception control data in S1724, and the communication apparatus 103 transfers the reception response control data as the response of receiving the communication route control data to the communication apparatus that transferred the communication route control data.

The data communication unit 1601 in the communication apparatus 103 receives the content data transferred by the communication apparatus 102 (YES in S1727).

In this case, if the communication apparatus 103 receives the content data transferred by the communication apparatus 101 while the content data transferred by the communication apparatus 102 is being received (YES in S1728), the detection result notification unit 1605 in the communication apparatus 103 transfers communication resuming notification indicating that the communication with the communication apparatus 101 is resumed to the communication apparatus 102 in S1729. Subsequently, the communication apparatus 103 disconnects the communication with the communication apparatus 102 in S1730.

As described above, if the communication between the communication apparatuses 101 and 103 is resumed, the communication apparatus 103 can get back to the previous communication route easily by reporting the communication apparatus 102 that the communication with the communication apparatus 101 is resumed. Furthermore, it is possible to reduce waste of communication resources due to receiving same data from multiple communication apparatuses.

Embodiment 6

A configuration in this embodiment is described below. In this embodiment, communication between the communication apparatuses 101 and 103 is resumed after the communication between the communication apparatuses 101 and 103 is disconnected as shown in the embodiment 5.

Figure 18:
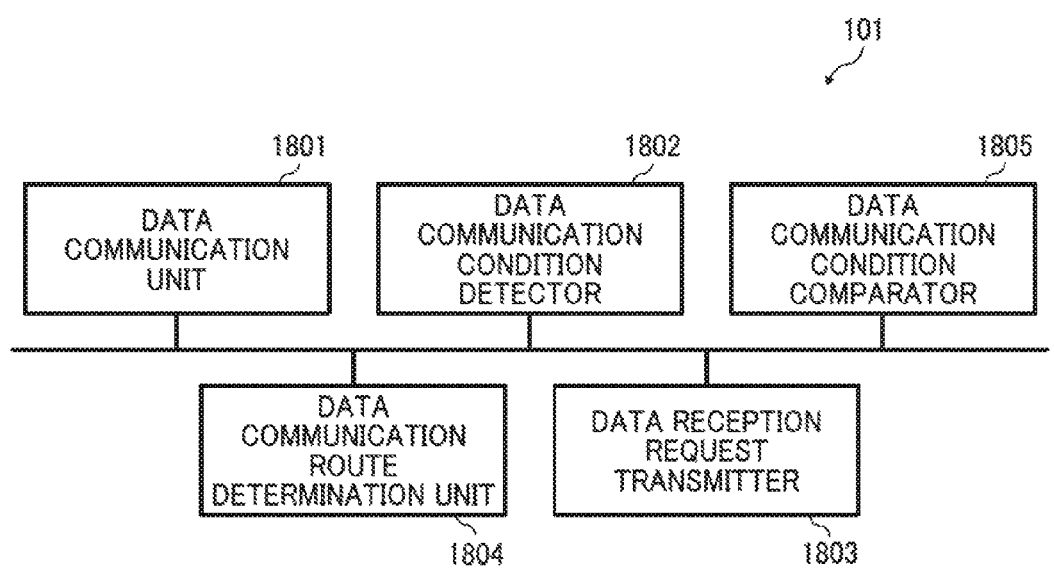
FIG. 18 is a diagram illustrating a function implemented by the CPU 201 in the communication apparatus 101 as a sixth embodiment of the present invention.

FIG. 18 is a diagram illustrating a function implemented by the CPU 201 in the communication apparatus 101 in this embodiment. Hardware configurations of the communication apparatuses 101, 102, and 103 are the same as the first embodiment. Since the communication apparatuses in FIG. 18 include similar functions, the communication apparatus 101 is used as a representative in the description below.

A data communication unit 1801, a data communication condition detector 1802, a data reception request transmitter 1803, a data communication route determination unit 1804, and a data communication condition comparator 1805 are implemented by the CPU 201 included in the communication apparatus 101 in this embodiment.

The data communication unit 1801, the data communication condition detector 1802, the data reception request transmitter 1803, the data communication route determination unit 1804, and the data communication condition comparator 1805 are implemented by executing programs stored in the memory 202 by the CPU 201.

The data communication unit 1801 communicates content data with other communication apparatuses that construct the communication system via the antenna unit 206. In this case, image information and video information etc. processed by the communication apparatus 101 are the content data. The image information and the video information etc. are stored in the memory 202. The data communication unit 1801 performs wireless communication with the other communication apparatus 10N using the wireless communication standard such as the EHF wireless communication.

The data communication condition detector 1802 detects communication condition of the data communication performed by the data communication unit 1801. For example, the data communication condition detector 1802 detects the communication condition of the content data performed by the data communication unit 1801 by monitoring communication radio field intensity and a type of the received data etc. For example, the data communication condition detector 1802 detects that the communication of the content data performed by the data communication unit 1801 is disconnected if the communication radio field intensity becomes less value than a predetermined threshold.

After the data communication condition detector 1802 detects that the communication of the content data is disconnected, the data reception request transmitter 1803 transfers a reception request for receiving the content data to the other communication apparatus 10N in the communication system.

The data communication route determination unit 1804 determines communication route of communicating the content data in the communication system. The data communication unit 1801 communicates the content data using the communication route determined by the data communication route determination unit 1804. For example, after receiving the reception request for receiving the content data transferred by the data reception request transmitter 1803 in the other communication apparatus 10N in the communication system, the data communication route determination unit 1804 determines the communication route of transferring the content data received by the data communication unit 1801 to the communication apparatus that transfers the reception request.

The data communication condition comparator 1805 compares communication conditions in multiple communication routes. For example, the data communication condition comparator 1805 compares a communication condition of the content data in the communication route between the communication apparatuses 101 and 103 (i.e., a communication route A) with a communication condition of the content data in the communication route between the communication apparatuses 102 and 103 (i.e., a communication route B). For example, in comparing the communication condition of the content data, communication radio field intensity in the communication route A is compared with communication radio field intensity in the communication route B.

In addition, the data communication route determination unit 1804 determines the communication route used for communicating the content data using the comparison result by the data communication condition comparator 1805. For example, among the communication routes compared by the data communication condition comparator 1805, the data communication route determination unit 1804 determines the communication route whose communication radio field intensity is higher as the communication route used for communicating the content data.

It is possible to divide or distribute the functions described above, the data communication unit 1801, the data communication condition detector 1802, the data reception request transmitter 1803, the data communication route determination unit 1804, and the data communication condition comparator 1805, to complement with each other.

Figure 19C:
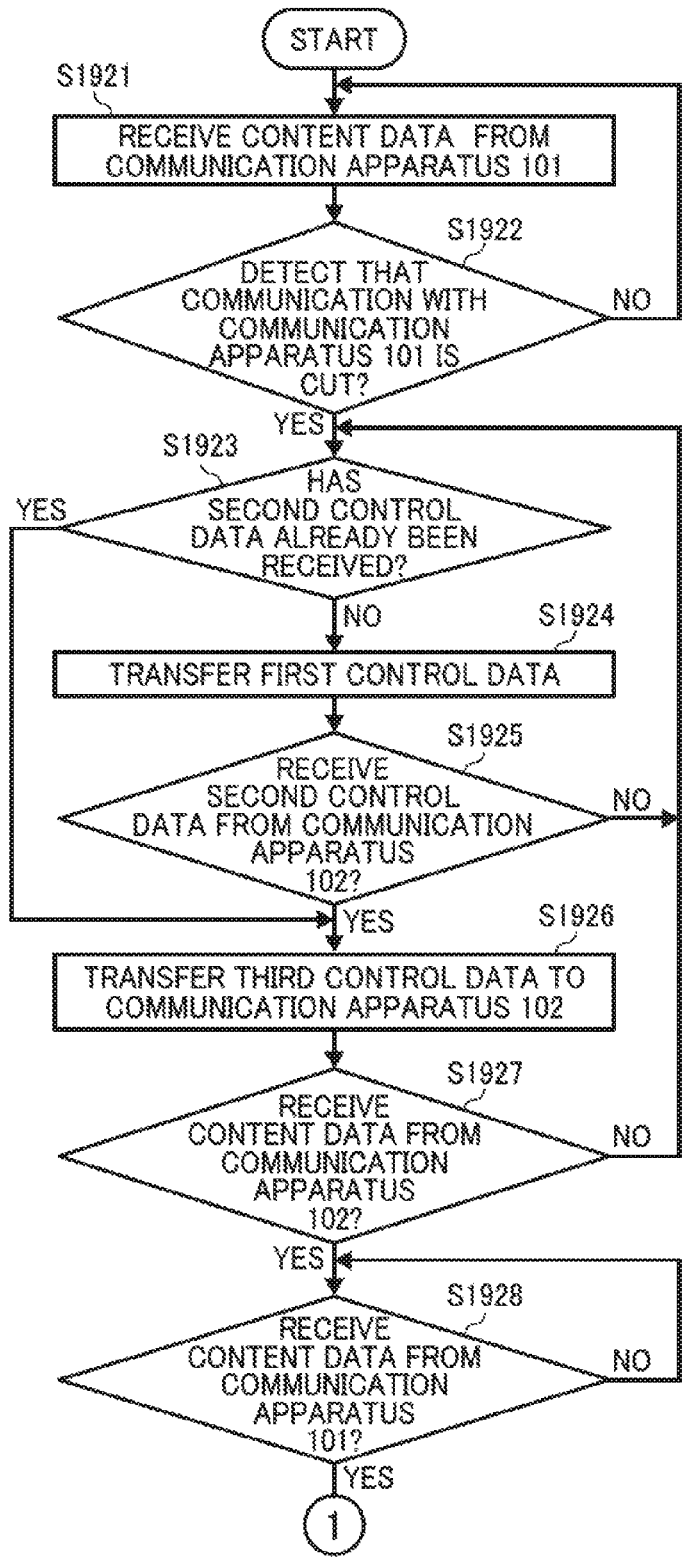

FIGS. 19A, 19B, 19CA, and 19CB are diagrams illustrating a sequence that changes the communication route in the communication system in the sixth embodiment.

The communication apparatus 101 transfers the content data to the communication apparatuses 102 and 103 using the data communication unit 1801 in S1901. The content data is transferred from the communication apparatus 101 to the communication apparatuses 102 and 103 by performing wireless communication whose directivity is controlled using the antenna unit 206. For example, the communication apparatuses 101, 102, and 103 construct the autonomous distributed mesh network using the EHF wireless communication.

Next, as shown in FIG. 4, if the obstacle 401 appears on the communication route between the communication apparatuses 101 and 103, the data communication condition detector 1802 in the communication apparatus 101 detects that the communication with the communication apparatus 103 is disconnected in S1902. For example, if the data communication condition detector 1802 in the communication apparatus 101 cannot receive the reception response of the content data from the communication apparatus 103, it is possible to detect that the communication with the communication apparatus 103 is disconnected. Otherwise, by monitoring the communication radio field intensity, the data communication condition detector 1802 in the communication apparatus 101 can detect that the communication is disconnected if the communication radio field intensity becomes less value than the predetermined threshold.

After detecting that the communication with the communication apparatus 103 is disconnected (YES in S1902), the communication apparatus 101 transfers the content data to the communication apparatus 102 in S1903.

In this case, if the communication apparatus 101 detects that the communication with the communication apparatus 103 is resumed (YES in S1904), the communication apparatus 101 transfers the content data to the communication apparatus 103 in S1905.

After that, if the communication apparatus 101 receives communication disconnecting notification indicating that the communication of the content data is disconnected from the communication apparatus 103 (YES in S1906), the communication apparatus 101 disconnects the communication with the communication apparatus 103 in S1907.

Next, a procedure in the communication apparatus 102 is described below with reference to steps S1911 to S1918.

The data communication unit 1801 in the communication apparatus 102 receives the content data transferred by the communication apparatus 101 in S1911.

Here, if the communication apparatus 102 receives the reception control data for controlling receiving the content data if the communication with the communication apparatus 101 is disconnected from the communication apparatus 103 (YES in S1913), the communication apparatus 102 transfers the communication route control data for controlling the communication route between the communication apparatuses 102 and 103 to the communication apparatus 103 in S1914. The communication rote control data includes information indicating that the reception control data is received in addition to apparatus identification information of the communication apparatus 102.

If the communication apparatus 102 has already received the reception control data (YES in S1912), the communication route control data is not transferred to the communication apparatus 103.

Next, if the communication apparatus 102 receives the reception response control data as the response of receiving the communication route control data from the communication apparatus 103 (YES in 1915), the communication apparatus 102 transfers the content data transferred by the communication apparatus 101 to the communication apparatus 103 in S1916.

Here, if the communication apparatus 102 receives communication resuming notification indicating that the communication with the communication apparatus 101 is resumed from the communication apparatus 103 (YES in S1917), the communication apparatus 102 disconnects the communication with the communication apparatus 103 in S1918. As a result, the communication apparatus 102 is in the state in S1911 that receives the content data from the communication apparatus 101.

Next, a procedure in the communication apparatus 103 is described below with reference to steps S1921 to S1932.

The data communication unit 1801 in the communication apparatus 103 receives the content data transferred by the communication apparatus 101 in S1921.

Next, as shown in FIG. 4, if the obstacle 401 appears on the communication route between the communication apparatuses 101 and 103, the data communication condition detector 1802 in the communication apparatus 103 detects that the communication with the communication apparatus 101 is disconnected in S1922. For example, it is possible to detect that the communication is disconnected if the communication apparatus 103 cannot receive the content data transferred by the communication apparatus 101. Otherwise, by monitoring the communication radio field intensity, the data communication condition detector 1802 in the communication apparatus 103 can detect that the communication is disconnected if the communication radio field intensity becomes less value than the predetermined threshold.

In case of detecting that the communication with the communication apparatus 101 is disconnected (YES in S1922), the communication apparatus 103 transfers the reception control data for controlling receiving the content data transferred by the communication apparatus 101 in S1924.

It is possible that the reception control data is transferred to other communication apparatuses in the communication system using a broadcast frame. Otherwise, it is possible to transfer the reception control data to a designated counterpart communication apparatus (e.g., the communication apparatus 102). In case of transferring the reception control data designating the counterpart communication apparatus, it is possible that the reception control data includes the apparatus identification information of the counterpart communication apparatus (e.g., the communication apparatus 102).

Next, after receiving the communication route control data to control the communication route from the communication apparatus 102 (YES in S1925), the communication apparatus 103 transfers the reception response control data as the response of receiving the communication route control data to the communication apparatus 102 in S1926.

If the communication apparatus 103 detects that the communication with the communication apparatus 101 is disconnected (YES in S1922) and has already received that the communication route control data for controlling the communication route (YES in S1923), the communication apparatus 103 does not transfer the reception control data in S1924, and the communication apparatus 103 transfers the reception response control data as the response of receiving the communication route control data to the communication apparatus that transferred the communication route control data.

The data communication unit 1801 in the communication apparatus 103 receives the content data transferred by the communication apparatus 102 (YES in S1927).

In this case, if the communication apparatus 103 receives the content data transferred by the communication apparatus 101 while the content data transferred by the communication apparatus 102 is being received (YES in S1928), the data communication condition comparator 1805 in the communication apparatus 103 compares the communication condition of the content data between the communication apparatuses 101 and 103 with the communication condition of the content data between the communication apparatuses 102 and 103 in S1929.

If the data communication condition comparator 1805 determines that the communication condition with the communication apparatus 102 is better (YES in S1930), the communication apparatus 103 transfers the communication disconnecting notification indicating that the communication of the content data is disconnected to the communication apparatus 101 in S1931.

If the data communication condition comparator 1805 determines that the communication condition with the communication apparatus 101 is better (NO in S1930), the communication apparatus 103 transfers the communication disconnecting notification indicating that the communication of the content data is disconnected to the communication apparatus 102 in S1932.

As described above, if the communication between the communication apparatuses 101 and 103 is resumed and the communication apparatus 103 can receive the content data from both the communication apparatus 101 and the communication apparatus 102, the communication apparatus 103 can receive the content data from the communication apparatus that has the communication route with better communication condition by comparing the communication condition between the communication apparatuses 101 and 103 with the communication condition between the communication apparatuses 102 and 103 and determine the most appropriate communication route to receive the content data.

As described in the embodiments above, in the communication system that includes multiple communication apparatuses compatible with the wireless communication standards using multiple frequency bands, the communication system that can configure the communication network with multiple communication apparatuses dynamically is provided.

The present invention also encompasses a non-transitory recording medium storing a program that executes a communication method, performed by a communication system that a data transmission apparatus transfers content data to multiple communication apparatuses using wireless communication. The communication method, performed by the communication system, includes the steps of transferring first control data including a request of receiving the content data transferred by the data transmission apparatus from a first communication apparatus whose communication with the data transmission apparatus is disconnected to a second communication apparatus, and transferring the content data transferred by the data transmission apparatus from the second communication apparatus that receives the first control data to the first communication apparatus.

In the above-described example embodiment, a computer can be used with a computer-readable program, described by object-oriented programming languages such as C++, C#, Java (registered trademark), or legacy programming languages such as machine language, assembler language, C language to control functional units used for the apparatus or system. The computer software can be provided to the programmable device using any storage medium or carrier medium for storing processor-readable code such as a floppy disk, a compact disk read only memory (CD-ROM), a digital versatile disk read only memory (DVD-ROM), DVD recording only/rewritable (DVD-R/RW), Blu-ray disc, electrically erasable and programmable read only memory (EE-PROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these. A part of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor, as a processor includes circuitry. A processing circuit also includes devices such as an application specific integrated circuit (ASIC) and conventional circuit components arranged to perform the recited functions.

What is claimed is:

1. A communication system, comprising:
a first communication apparatus;
a second communication apparatus; and
a third communication apparatus,
wherein the first communication apparatus transfers content data by using wireless communication, both to the second communication apparatus and to the third communication apparatus,
the second communication apparatus includes a first communication unit to transfer, to the third communication apparatus, first control data including a reception request requesting the third communication apparatus to re-transfer to the second communication apparatus the content data received by the third communication apparatus by the wireless communication from the first communication apparatus, when the wireless communication between the second communication apparatus and the first communication apparatus is disconnected, and
the third communication apparatus includes a second communication unit to re-transfer to the second communication apparatus, the content data which was received by the third communication apparatus by the wireless communication from the first communication apparatus, when the third communication apparatus receives the first control data including the reception request from the second communication apparatus.

2. The communication system according to claim 1, wherein the wireless communication between the second communication apparatus and the third communication apparatus is ad hoc communication.

3. The communication system according to claim 1, wherein each of the communication apparatuses further includes an antenna for the wireless communication, the antenna having a directivity of the wireless communication that is controllable,
the first communication unit of the second communication apparatus transfers the first control data by the wireless communication via the antenna of the second communication apparatus, and
the second communication unit of the third communication apparatus transfers the content data received from the first communication apparatus, by the wireless communication via the antenna of the third communication apparatus.

4. The communication system according to claim 1, wherein a time of receiving the content data from the first communication apparatus, in the second communication unit of the third communication apparatus, is different from a time of receiving the first control data from the second communication apparatus, in the second communication unit.

5. The communication system according to claim 4, wherein the first communication apparatus includes a third communication unit to transfer second control data specifying the time of receiving the first control data to the third communication apparatus when the communication between the first communication apparatus and the second communication apparatus is disconnected,
the second communication unit of the third communication apparatus receives the first control data at the reception time specified by the second control data,
the first control data is a beacon frame for detecting another communication apparatus with which the second communication apparatus can communicate, the second control data is data specifying a time of receiving the beacon frame, and the time of receiving the beacon frame is different from the time used for communicating the content data between the first communication apparatus and the third communication apparatus.

6. The communication system according to claim 1, wherein the second communication unit of the third communication apparatus transfers third control data, including a radio field intensity associated with receiving the first control data from the second communication apparatus, to the second communication apparatus, when the third communication apparatus receives the first control data including the reception request, and the second communication apparatus determines the third communication apparatus as a communication apparatus to which the content data transferred by the first communication apparatus is transferred when the radio field intensity associated with receiving the first control data included in the third control data is higher than a predetermined threshold value.

7. The communication system according to claim 6, further comprising a fourth communication apparatus, the fourth communication apparatus including a fourth communication unit to transfer third control data, including a radio field intensity associated with receiving the first control data from the second communication apparatus, to the second communication apparatus, when the fourth communication unit of the fourth communication apparatus receives the content data from the first communication apparatus and the first control data from the second communication apparatus, wherein the second communication apparatus determines a communication apparatus to which the content data received from the first communication apparatus is to be transferred based on the third control data which is transferred by each of the third communication apparatus and the fourth communication apparatus.

8. The communication system according to claim 7, wherein the second communication apparatus determines a communication apparatus whose radio field intensity associated with receiving the first control data, included in the third control data which is transferred by each of the third communication apparatus and the fourth communication apparatus, is higher as the communication apparatus to which the content data transferred by the first communication apparatus is transferred.

9. The communication system according to claim 7, wherein the third control data transferred by the third communication apparatus further includes at least one of a number of communication apparatuses that the third communication apparatus is communicating with, a number of hops that the third communication apparatus uses to perform wireless communication, and information on a communication band that the third communication apparatus requests, the third control data transferred by the fourth communication apparatus further includes at least one of a number of communication apparatuses that the fourth communication apparatus is communicating with, a number of hops that the fourth communication apparatus uses to perform wireless communication, and information on a communication band that the fourth communication apparatus requests, and the second communication apparatus determines a communication apparatus which performs communication to receive the content data transferred by the first communication apparatus based on at least one of the radio field intensity associated with receiving the first control data, the number of communication apparatuses being communicated with, the number of hops being used to perform wireless communication, and the information on the communication band included in the third control data.

10. The communication system according to claim 1, wherein the first communication unit of the second communication apparatus transfers fourth control data, indicating that the communication with the first communication apparatus is resumed, to the third communication apparatus when the communication with the first communication apparatus is resumed, and the second communication unit of the third communication apparatus stops transferring the content data to the second communication apparatus when the fourth control data is received.

11. The communication system according to claim 1, wherein the second communication apparatus determines a communication apparatus which performs communication to receive the content data transferred by the first communication apparatus and the third communication apparatus based on a radio field intensity associated with receiving the content data when the communication between the second communication apparatus and the first communication apparatus is resumed.

12. A communication apparatus in a communication system in which a data transmission apparatus transfers content data to plural communication apparatuses using wireless communication, the communication apparatus comprising a processor and one or more programs of executable instructions embodied in a non-transitory medium and executable by the processor to configure the communication apparatus to perform a process comprising the steps of:

receiving, by said communication apparatus as a first communication apparatus amongst the plural communication apparatuses, the content data transferred by the data transmission apparatus using the wireless communication, both to said communication apparatus as the first communication apparatus and to a second communication apparatus;

receiving by the first communication apparatus from the second communication apparatus first control data including a reception request requesting the first communication apparatus to re-transfer to the second communication apparatus the content data transferred by the data transmission apparatus by the wireless communication to the first communication apparatus, when the wireless communication between the second communication apparatus and the data transmission apparatus is disconnected, and re-transferring, by the first communication apparatus to the second communication apparatus, the content data which was received by the first communication apparatus by the wireless communication from the data transmission apparatus, when the first communication apparatus receives the first control data including the reception request from the second communication apparatus.

13. A communication method, performed in a communication system in which a data transmission apparatus transfers content data to plural communication apparatuses using wireless communication, the method comprising:

receiving, by a first communication apparatus in the communication system, the content data transferred by the data transmission apparatus using the wireless communication, both to the first communication apparatus and to a second communication apparatus in the communication system;

transferring, by the first communication apparatus to the second communication apparatus, first control data including a reception request requesting the second communication apparatus to re-transfer to the first communication apparatus the content data transferred by the data transmission apparatus by the wireless communication to the second communication apparatus, when wireless communication between the first communication apparatus with the data transmission apparatus is disconnected; and receiving, by the first communication apparatus from the second communication apparatus in response to the first control data including a reception request, the content data which was received by the second communication apparatus by the wireless communication from the data transmission apparatus, when the second communication apparatus receives the first control data including the reception request from the first communication apparatus.

14. The communication system according to claim 1, wherein the wireless communication between the second communication apparatus and the third communication apparatus is ad hoc communication, each of the communication apparatuses further includes an antenna to perform the wireless communication, the antenna having a directivity of the wireless communication that is controllable, the first communication unit of the second communication apparatus transfers the first control data by the wireless communication via the antenna of the second communication apparatus, and the second communication unit of the third communication apparatus transfers the content data transferred by the first communication apparatus by the wireless communication via the antenna of the third communication apparatus.

15. The communication system according to claim 1, wherein each of the communication apparatuses further includes an antenna for the wireless communication, antenna having a directivity of the wireless communication that is controllable, the first communication unit of the second communication apparatus transfers the first control data by the wireless communication via the antenna of the second communication apparatus, the second communication unit of the third communication apparatus transfers the content data transferred by the first communication apparatus, by the wireless communication via the antenna of the third communication apparatus, and a time of receiving the content data transferred by the first communication apparatus, in the second communication unit is different from a time of receiving the first control data transferred by the second communication apparatus, in the second communication unit.

16. The communication system according to claim 1, wherein each of the communication apparatuses further includes an antenna for the wireless communication, the antenna having a directivity of the wireless communication that is controllable, the first communication unit of the second communication apparatus transfers the first control data by the wireless communication via the antenna of the second communication apparatus, the second communication unit of the third communication apparatus transfers the content data transferred by the first communication apparatus by the wireless communication via the antenna of the third communication apparatus, a time of receiving the content data transferred by the first communication apparatus, in the second communication unit, is different from a time of receiving the first control data transferred by the second communication apparatus, in the second communication unit, the first communication apparatus includes a third communication unit to transfer second control data specifying the time of receiving the first control data to the third communication apparatus when the communication between the first communication apparatus and the second communication apparatus is disconnected, and the second communication unit receives the first control data at the reception time specified by the second control data.

17. The communication system according to claim 1, wherein each of the communication apparatuses further includes an antenna for the wireless communication, the antenna having a directivity of the wireless communication that is controllable, the first communication unit of the second communication apparatus transfers the first control data using the antenna by the wireless communication via the antenna of the second communication apparatus, the second communication unit of the third communication apparatus transfers the content data transferred by the first communication apparatus using the antenna by the wireless communication via the antenna of the third communication apparatus, a time of receiving the content data transferred by the first communication apparatus, in the second communication unit, is different from a time of receiving the first control data transferred by the second communication apparatus, in the second communication unit, the first communication apparatus includes a third communication unit to transfer second control data specifying the time of receiving the first control data to the third communication apparatus when the communication between the first communication apparatus and the second communication apparatus is disconnected, the second communication unit receives the first control data at the reception time specified by the second control data, the first control data is a beacon frame for detecting another communication apparatus with which the second communication apparatus can communicate, the second control data is data specifying time of receiving the beacon frame, and the time of receiving the beacon frame is different from time used for communicating the content data between the first communication apparatus and the third communication apparatus.

18. The communication system according to claim 1, wherein each of the communication apparatuses further includes an antenna for the wireless communication, the antenna having a directivity of the wireless communication that is controllable, the first communication unit of the second communication apparatus transfers the first control data by the wireless communication via the antenna of the second communication apparatus, the second communication unit of the third communication apparatus transfers the content data transferred by the first communication apparatus, by the wireless communication via the antenna of the third communication apparatus, the second communication unit of the third communication apparatus transfers third control data including a radio field intensity associated with receiving the first control data from the second communication apparatus, to the second communication apparatus, when the second communication unit of the third communication apparatus receives the first control data, and the second communication apparatus determines the third communication apparatus as a communication apparatus to which the content data transferred by the first communication apparatus is transferred when the radio field intensity associated with receiving the first control data included in the third control data is higher than a predetermined threshold value.

19. The communication system according to claim 18, wherein the communication system further comprises a fourth communication apparatus, the fourth communication apparatus includes a fourth communication unit to transfer third control data, including a radio field intensity associated with receiving the first control data from the second communication apparatus, to the second communication apparatus, when the fourth communication unit of the fourth communication apparatus receives the content data from the first communication apparatus and the first control data from the second communication apparatus, and wherein the second communication apparatus determines a communication apparatus to which the content data transferred by the first communication apparatus is transferred based on the third control data which is transferred by each of the third communication apparatus and the fourth communication apparatus.

20. The communication system according to claim 1, wherein the first control data including the reception request, upon being received by the third communication apparatus from the second communication apparatus, causes the third communication apparatus to transfer the content data which was received by the third communication apparatus by the wireless communication directly from the first communication apparatus, to the second communication apparatus.

* * * * *